United States Patent
Islam et al.

(10) Patent No.: US 11,895,695 B2
(45) Date of Patent: Feb. 6, 2024

(54) SYSTEM AND METHOD FOR BEAM FAILURE RECOVERY REQUEST BY USER EQUIPMENT

(71) Applicant: QUALCOMM Incorporated, San Diego, CA (US)

(72) Inventors: Muhammad Nazmul Islam, Littleton, MA (US); Bilal Sadiq, Basking Ridge, NJ (US); Sony Akkarakaran, Poway, CA (US); Linhai He, San Diego, CA (US); Sundar Subramanian, San Diego, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/275,009

(22) Filed: Feb. 13, 2019

(65) Prior Publication Data

US 2019/0254064 A1    Aug. 15, 2019

Related U.S. Application Data

(60) Provisional application No. 62/631,398, filed on Feb. 15, 2018.

(51) Int. Cl.
*H04W 74/00* (2009.01)
*H04B 7/06* (2006.01)
(Continued)

(52) U.S. Cl.
CPC ............ *H04W 74/004* (2013.01); *H04B 7/04* (2013.01); *H04L 43/0817* (2013.01);
(Continued)

(58) Field of Classification Search
CPC .............. H04W 72/046; H04W 76/19; H04W 72/0413; H04W 74/006; H04W 16/28;
(Continued)

(56) References Cited

U.S. PATENT DOCUMENTS

| 2018/0034515 A1 | 2/2018 | Guo et al. |
| 2019/0075600 A1* | 3/2019 | Kwon ................. H04B 7/0695 |

(Continued)

FOREIGN PATENT DOCUMENTS

| CN | 105210444 A | 12/2015 |
| EP | 2731388 A1 | 5/2014 |

(Continued)

OTHER PUBLICATIONS

CHTTL: "Discussion on Beam Failure Recovery", 3GPP Draft; R1-1708380, 3rd Generation Partnership Project (3GPP), Mobile Competence Centre ; 650, Route Des Lucioles; F-06921 Sophia-Antipolis Cedex; France, vol. RAN WG1, No. Hangzhou; May 15 2017-May 19, 2017, May 14, 2017 (May 14, 2017), 5 Pages, XP051273573, Retrieved from the Internet: URL: http://www.3gpp.org/ftp/Meetings_3GPP_SYNC/RAN1/Docs/ [retrieved on May 14, 2017].

(Continued)

*Primary Examiner* — Jae Y Lee
*Assistant Examiner* — Aixa A Guadalupe Cruz
(74) *Attorney, Agent, or Firm* — ArentFox Schiff LLP

(57) ABSTRACT

An apparatus may determine whether to indicate a beam failure recovery request to a base station using a contention-free RACH procedure with a dedicated preamble when the UE is timing unsynchronized with the base station. The apparatus may perform, when the apparatus is timing unsynchronized with the base station, the contention-free RACH procedure with the dedicated preamble to indicate the beam failure recovery request when the beam failure recovery (Continued)

request is determined to be indicated to the base station using the contention-free RACH procedure with the dedicated preamble. The apparatus may perform, when the apparatus is timing unsynchronized with the base station, a contention-based RACH procedure to indicate the beam failure recovery request when the beam failure recovery request is undetermined to be sent to the base station using the contention-free RACH procedure with the dedicated preamble.

30 Claims, 12 Drawing Sheets

(51) Int. Cl.
| | |
|---|---|
| H04B 7/08 | (2006.01) |
| H04B 17/318 | (2015.01) |
| H04L 41/0654 | (2022.01) |
| H04W 76/18 | (2018.01) |
| H04W 76/19 | (2018.01) |
| H04L 43/0817 | (2022.01) |
| H04W 56/00 | (2009.01) |
| H04W 74/04 | (2009.01) |
| H04W 74/08 | (2009.01) |
| H04B 7/04 | (2017.01) |
| H04W 16/00 | (2009.01) |
| H04W 72/21 | (2023.01) |

(52) U.S. Cl.
CPC ......... *H04W 16/00* (2013.01); *H04W 56/001* (2013.01); *H04W 72/21* (2023.01); *H04W 74/04* (2013.01); *H04W 74/0883* (2013.01); *H04W 76/19* (2018.02)

(58) Field of Classification Search
CPC ... H04W 76/11; H04W 72/04; H04W 56/001; H04W 74/08; H04W 74/004; H04W 74/008; H04W 76/18; H04W 56/00; H04W 74/00; H04W 74/04; H04B 7/0695; H04B 7/02; H04B 7/024; H04B 7/04; H04B 7/0404; H04B 7/0408; H04B 7/0413; H04B 7/0888; H04L 43/0817
See application file for complete search history.

(56) References Cited

U.S. PATENT DOCUMENTS

| | | | | |
|---|---|---|---|---|
| 2019/0082335 A1* | 3/2019 | Yu | ......................... | H04W 24/04 |
| 2019/0098520 A1* | 3/2019 | Kim | .................... | H04B 7/0695 |
| 2019/0150010 A1* | 5/2019 | Kwon | ................... | H04W 24/10 |
| | | | | 370/252 |
| 2019/0166539 A1* | 5/2019 | Chen | ..................... | H04W 36/36 |
| 2019/0200248 A1* | 6/2019 | Basu Mallick | ...... | H04B 7/0695 |
| 2019/0215706 A1* | 7/2019 | Tsai | ..................... | H04W 72/042 |
| 2019/0230545 A1* | 7/2019 | Liou | ..................... | H04W 24/10 |
| 2019/0349960 A1* | 11/2019 | Li | .......................... | H04L 5/0055 |
| 2020/0092785 A1* | 3/2020 | Yang | ..................... | H04W 76/19 |
| 2020/0112993 A1* | 4/2020 | Tsai | ..................... | H04L 5/0048 |
| 2020/0351853 A1* | 11/2020 | Xiong | ................. | H04W 74/006 |

FOREIGN PATENT DOCUMENTS

| | | |
|---|---|---|
| WO | 2017024516 A1 | 2/2017 |
| WO | 2017209417 A1 | 12/2017 |

OTHER PUBLICATIONS

International Search Report and Written Opinion—PCT/US2019/018093—ISA/EPO—dated Jun. 13, 2019.
Mediatek Inc: "Discussion on Beam Recovery Mechanism," 3GPP Draft; R1-1707832_Beamrecoverymechanism_Final, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051273033, Retrieved from the Internet: URL : http://www.3gpp.org/ftp/Meetings_3GPP_SYNC/RAN1/Docs/ [retrieved on May 14, 2017].
Qualcomm Incorporated: "Beam Recovery Procedure", 3GPP Draft; R2-1703561 Beam-Recovery-Procedure, 3rd Generation Partnership Project (3GPP), Mobile Competence Centre; 650, Route des Lucioles; F-06921 Sophia-Antipolis Cedex; France, vol. RAN WG2, No. Spokane, USA; Apr. 3, 2017-Apr. 7, 2017, Apr. 3, 2017 (Apr. 3, 2017), pp. 1-4, XP051245400, Retrieved from the Internet: URL: http://www.3gpp.org/ftp/Meetings_3GPP_SYNC/RAN2/Docs/ [retrieved on Apr. 3, 2017] the whole document.
Lenovo, et al., "Discussion of Beam Recovery Procedure", 3GPP TSG RAN WG1 NR Ad-Hoc#2, R1-1710596, Qingdao, P.R. China Jun. 27-30, 2017, 5 Pages.
Lenovo, et al., "Prioritized Random Access for Beam Failure Recovery", 3GPP TSG-RAN WG2 Meeting#99bis, R2-1711382, Prague, Czech Republic, Oct. 9-13, 2017, 2 Pages.
Asustek: "Considerations on UE Beamforming Management", 3GPP TSG RAN WG1 Meeting #90, R1-1714383, Prague, Czech Republic, Aug. 21-25, 2017, 3 pages.

* cited by examiner

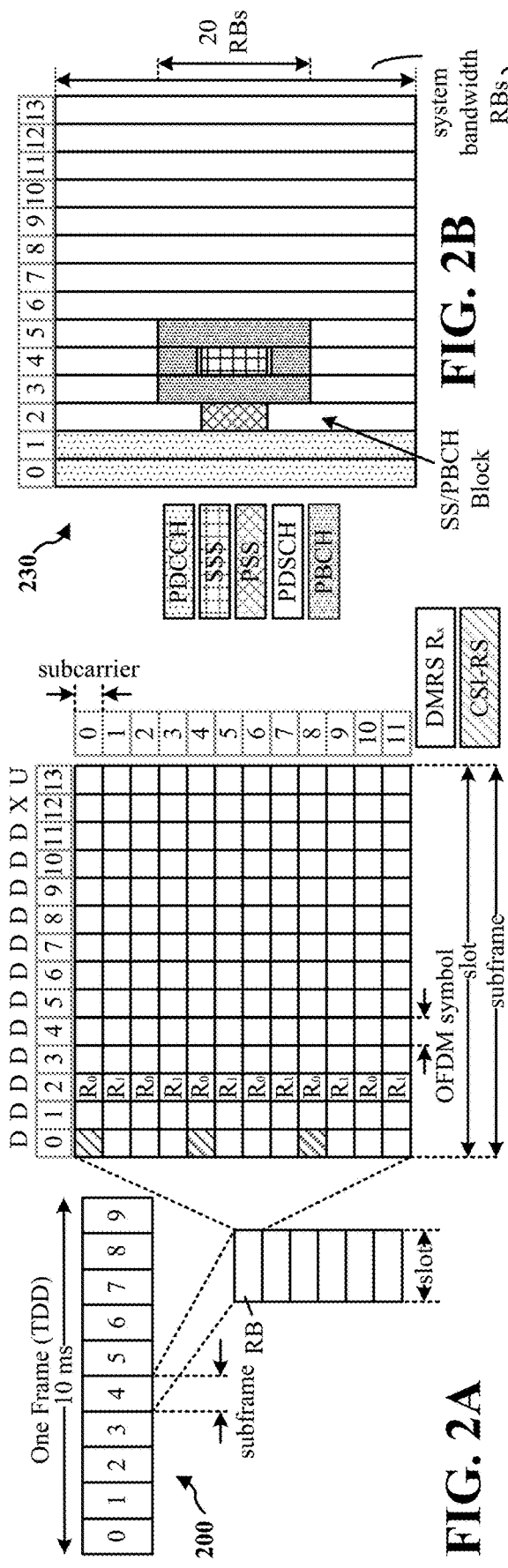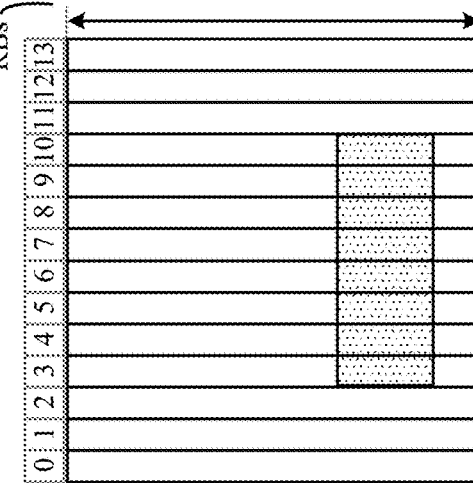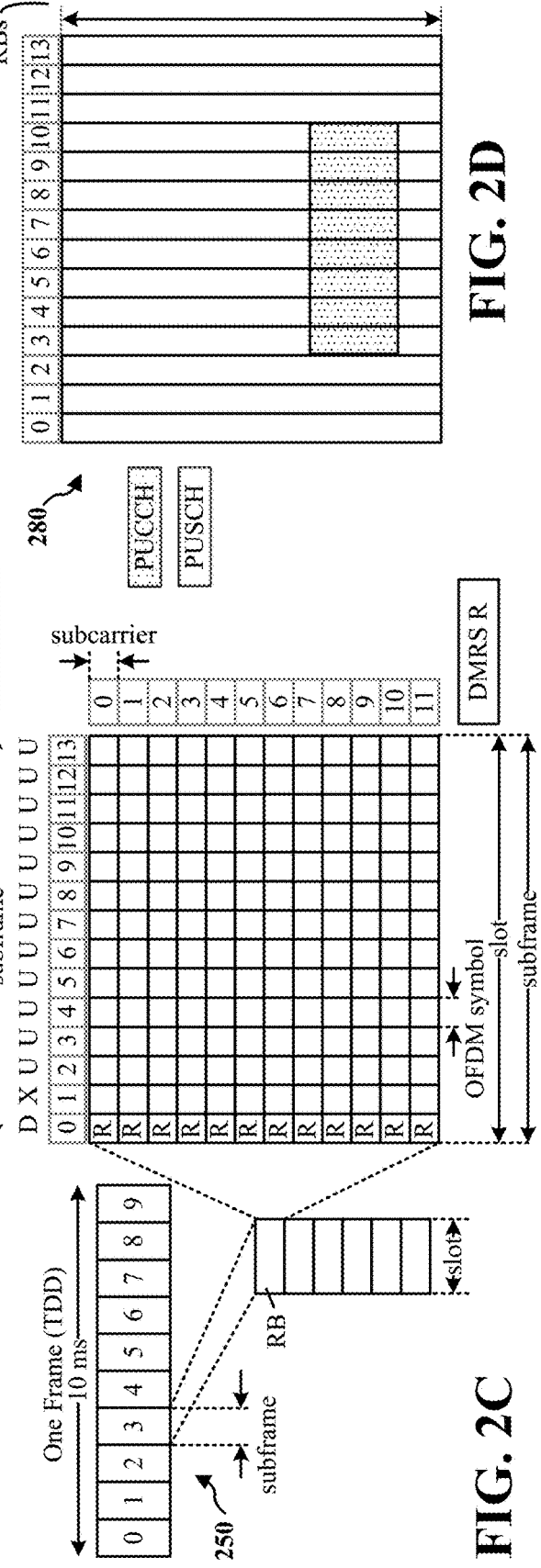
FIG. 2A  FIG. 2B  FIG. 2C  FIG. 2D

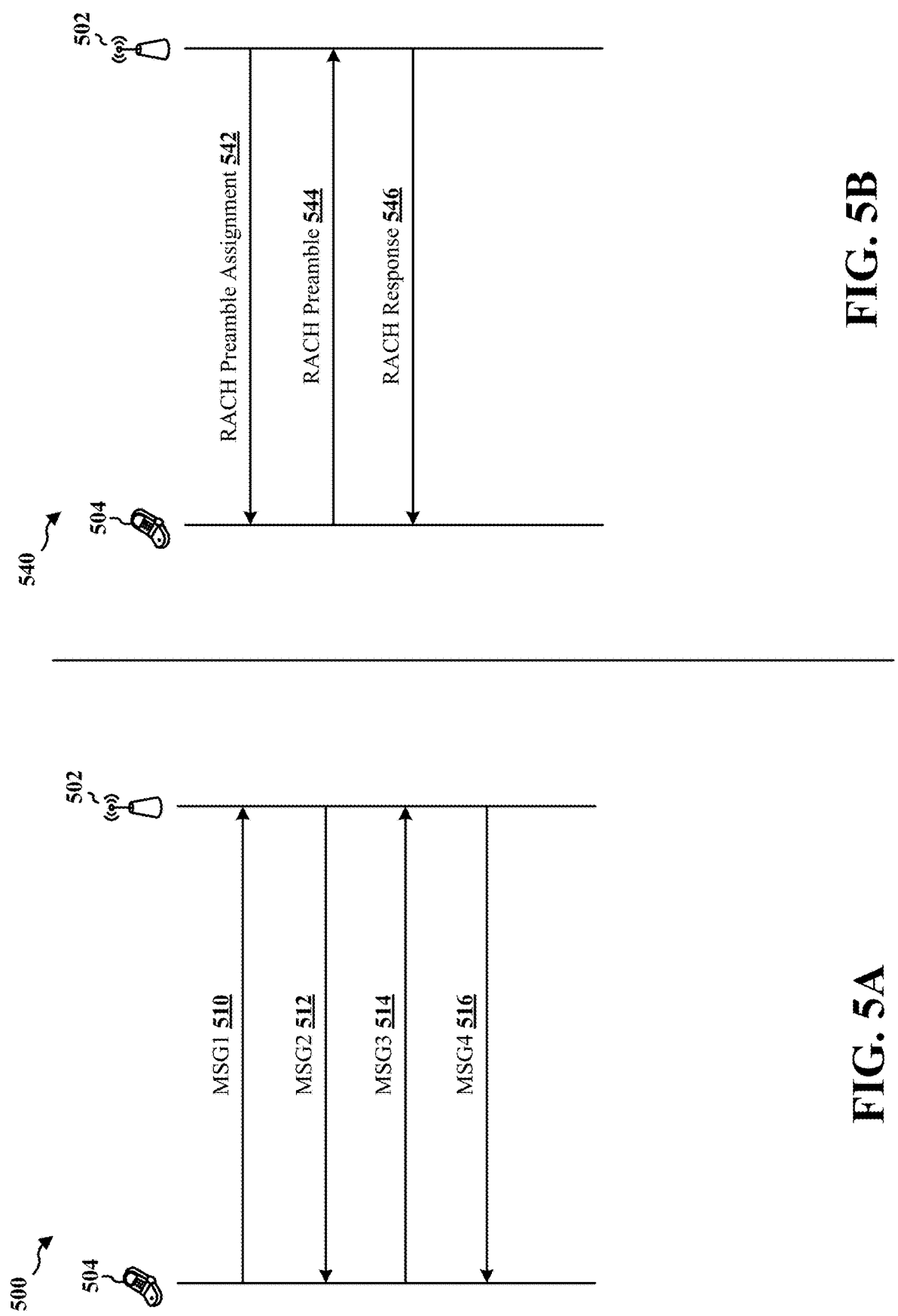

SYSTEM AND METHOD FOR BEAM FAILURE RECOVERY REQUEST BY USER EQUIPMENT

CROSS REFERENCE TO RELATED APPLICATION(S)

This application claims the benefit of U.S. Provisional Application Ser. No. 62/631,398, entitled "SYSTEM AND METHOD FOR BEAM FAILURE RECOVERY REQUEST BY TIMING UNSYNCHRONIZED USER EQUIPMENT" and filed on Feb. 15, 2018, which is expressly incorporated by reference herein in its entirety.

BACKGROUND

Technical Field

The present disclosure relates generally to communication systems, and more particularly, to a user equipment that is to transmit a beam failure recovery request when timing unsynchronized with a network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When communicating in a radio access network (RAN), a base station may send data or control information to a user equipment (UE) on a set of resources, which include time resources. For example, time resources may include frames, subframes, and/or symbols, which may be in milliseconds (ms) or microseconds (µs). Further, information carried in time resources may experience delay (e.g., propagation delay). Therefore, the UE may acquire timing synchronization with the base station so that time resources are aligned at the UE and the base station.

Potentially, the UE may lose timing synchronization with the base station. For example, the UE may become timing unsynchronized with the base station due to a radio link failure or when the UE does not apply a timing advance from the base station. According to one approach, the UE may acquire (or reacquire) timing synchronization with the base station by performing a contention-based random access channel (RACH) procedure.

The UE may also be configured to perform a contention-free RACH procedure with the base station. The contention-free RACH procedure may incur relatively less overhead than the contention-based RACH procedure—e.g., the contention-free RACH procedure may experience relatively less latency than the contention-based RACH procedure, the signaling commensurate with the contention-free RACH procedure may be relatively less than that commensurate with the contention-based RACH procedure.

In some existing networks, however, UEs may be unable to perform contention-free RACH procedures when timing unsynchronized with the base station. For example, a contention-free RACH procedure by a UE that is timing unsynchronized with the base station may potentially interfere with contention-free RACH procedures by other UEs that are timing synchronized with the base station.

Therefore, a need exists for an approach to performing a contention-free RACH procedure when a UE becomes timing unsynchronized with a base station. The present disclosure may describe various techniques and configurations for a UE to perform a contention-free RACH procedure when a UE becomes timing unsynchronized with a base station. According to some configurations, the UE may recover from a beam and/or radio link failure with the base station based on the contention-free RACH procedure, as described herein.

In an aspect of the disclosure, a method, a computer-readable medium, and an apparatus are provided. The apparatus may be a UE. The apparatus may determine whether to indicate a beam failure recovery request to a base station using a contention-free RACH procedure with a dedicated preamble when the UE is timing unsynchronized with the base station. The apparatus may perform, when the apparatus is timing unsynchronized with the base station, the contention-free RACH procedure with the dedicated preamble to indicate the beam failure recovery request when the beam failure recovery request is determined to be indicated to the base station using the contention-free RACH procedure with the dedicated preamble. The apparatus may perform, when the apparatus is timing unsynchronized with the base station, a contention-based RACH procedure to indicate the beam failure recovery request when the beam failure recovery request is undetermined to be sent to the base station using the contention-free RACH procedure with the dedicated preamble.

In one aspect, the apparatus may further detect a failure of a serving beam through which the apparatus communicates with the base station. The apparatus may further determine that the apparatus is timing unsynchronized with the base station, and the determination of whether to indicate the beam failure recovery request to the base station using the contention-free RACH procedure with the dedicated preamble is based on the detection of the failure of the serving beam and the determination that the apparatus is timing unsynchronized with the base station.

In one aspect, the detection of the failure of the serving beam is based on a block error rate (BLER) associated with one or more transport blocks (TBs) received through the serving beam. In one aspect, the apparatus is timing unsynchronized with the base station when a timing offset between the apparatus and the base station satisfies a threshold, and the threshold is configured by the base station. In one aspect, the apparatus is timing unsynchronized with the base station when a timing advance command is unreceived before expiration of an alignment timer. In one aspect, the apparatus may further perform the contention-free RACH procedure with the dedicated preamble to indicate the beam failure recovery request when the apparatus is timing synchronized with the base station.

In one aspect, the determination of whether to indicate the beam failure recovery request to the base station using the contention-free RACH procedure with the dedicated preamble when the apparatus is timing unsynchronized with the base station includes to determine whether a first set of resources allocated in association with the dedicated preamble at least partially overlaps with a second set of resources allocated in association with the contention-based RACH procedure, and the beam failure recovery request is determined to be indicated to the base station using the contention-free RACH procedure with the dedicated preamble when the first set of resources is determined to at least partially overlap with the second set of resources. In one aspect, at least one of the first set of resources or the second set of resources is associated with a RACH occasion, and the RACH occasion comprises a set of time and frequency resources for a RACH procedure.

In one aspect, the determination of whether to indicate the beam failure recovery request to the base station using the contention-free RACH procedure with the dedicated preamble when the UE is timing unsynchronized with the base station includes to determine whether a first zeroCorrelationZoneConfig value associated with the dedicated preamble is equal to a second zeroCorrelationZoneConfig value associated with the contention-based RACH procedure, and the beam failure recovery request is determined to be indicated to the base station using the contention-free RACH procedure with the dedicated preamble when the first zeroCorrelationZoneConfig value is equal to the second zeroCorrelationZoneConfig value. In one aspect, the determination of whether to indicate the beam failure recovery request to the base station using the contention-free RACH procedure with the dedicated preamble when the apparatus is timing unsynchronized with the base station further includes to determine whether a first root sequence index associated with the dedicated preamble is equal to a second root sequence index associated with the contention-based RACH procedure, and the beam failure recovery request is further determined to be indicated to the base station using the contention-free RACH procedure with the dedicated preamble when the first root sequence index is equal to the second root sequence index.

In one aspect, the performance of the contention-free RACH procedure with the dedicated preamble includes to send the dedicated preamble to the base station, and to receive a random access response from the base station based on the dedicated preamble, and the random access response indicates at least one of a timing advance, a cell radio network temporary identifier (C-RNTI), or an uplink grant, and, further, to acquire timing synchronization based on at least the timing advance. In one aspect, the apparatus may further determine a candidate beam for communication with the base station, and the dedicated preamble is sent through the candidate beam.

In one aspect, the contention-based RACH procedure is associated with a first set of resources and the dedicated preamble of the contention-free RACH procedure is associated with a second set of resources, and the first set of resources and the second set of resources are frequency-division multiplexed. In one aspect, the dedicated preamble is code-division multiplexed with one or more other preambles associated with the contention-based RACH procedure. In one aspect, the apparatus may further receive, from the base station, a first set of parameters associated with the contention-based RACH procedure, and receive, from the base station, information associated with the beam failure recovery request, wherein the information associated with the beam failure recovery request comprises a second set of parameters associated with the contention-free RACH procedure with the dedicated preamble. In one aspect, the first set of parameters is received in at least one system information block (SIB), and the second set of parameters is received via radio resource control (RRC) signaling.

In another aspect of the disclosure, another method, another computer-readable medium, and another apparatus are provided. The other apparatus may be a base station. The other apparatus may configure a first set of parameters associated with a contention-based RACH procedure. The other apparatus may configure a second set of parameters associated with a contention-free RACH procedure with a dedicated preamble, and the contention-free RACH procedure with the dedicated preamble is associated with a beam failure recovery request. The other apparatus may broadcast the first set of parameters in a cell. The other apparatus may send the second set of parameters to a UE operating on the cell.

In one aspect, the other apparatus may determine whether the UE is permitted to indicate the beam failure recovery request using the contention-free RACH procedure with the dedicated preamble when the UE is timing unsynchronized with the other apparatus. In one aspect, the UE is timing unsynchronized with the other apparatus when boundaries of at least one of symbols, slots, subframes, or any combination thereof are unaligned between the other apparatus and the UE. In one aspect, the UE is timing unsynchronized with the other apparatus when a timing offset between the other apparatus and the UE exceeds a threshold configured by the other apparatus.

In one aspect, a first set of resources allocated to the UE in association with the contention-based RACH procedure at least partially overlaps with a second set of resources allocated in association with the dedicated preamble when the UE is permitted to indicate the beam failure recovery request using the contention-free RACH procedure with the dedicated preamble and the UE is timing unsynchronized with the other apparatus. In one aspect, a first set of resources allocated to the UE in association with the contention-based RACH procedure does not overlap with a second set of resources allocated in association with the dedicated preamble when the UE is unpermitted to indicate the beam failure recovery request using the contention-free RACH procedure with the dedicated preamble and the UE is timing unsynchronized with the other apparatus.

In one aspect, a first zeroCorrelationZoneConfig value associated with the first set of parameters is equal to a second zeroCorrelationZoneConfig value associated with the second set of parameters when the UE is permitted to indicate the beam failure recovery request using the contention-free RACH procedure with the dedicated preamble and the UE is timing unsynchronized with the other apparatus. in one aspect, a first root sequence index associated with the first set of parameters is equal to a second root sequence index associated with the second set of parameters when the UE is permitted to indicate the beam failure recovery request using the contention-free RACH procedure with the dedicated preamble and the UE is timing unsynchronized with the other apparatus. In one aspect, the other apparatus may further perform, with the UE, the contention-free RACH procedure with the dedicated preamble based on the second set of parameters when the UE is permitted to indicate the beam failure recovery request using the contention-free RACH procedure with the dedicated preamble and the UE is timing unsynchronized with the other apparatus.

In one aspect, the performance, with the UE, of the contention-free RACH procedure with the dedicated preamble based on the second set of parameters may include to receive the dedicated preamble from the UE through a candidate beam different from a serving beam, and to send a random access response to the UE based on the dedicated preamble, and the random access response may indicate at least one of a timing advance, a C-RNTI, or an uplink grant. In one aspect, the dedicated preamble is received through the candidate beam based on a failure of the serving beam through which the other apparatus communicates with the UE, and wherein the candidate beam corresponds to at least one reference signal. In one aspect, the apparatus may further assign one or more dedicated RACH resources to the at least one reference signal, and configure a threshold associated with the at least one reference signal, and the threshold may be associated with the beam failure recovery request.

In one aspect, the contention-based RACH procedure is associated with a first set of resources and the dedicated preamble of the contention-free RACH procedure is associated with a second set of resources, and the first set of resources and the second set of resources are frequency-division multiplexed. In one aspect, the dedicated preamble is code-division multiplexed with one or more other preambles associated with the contention-based RACH procedure. In one aspect, the first set of parameters is broadcast in at least one SIB, and the second set of parameters is signaled in one or more RRC messages.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 5A and 5B are diagrams of call flows of a wireless communications system.

DETAILED DESCRIPTION

Figure 1:
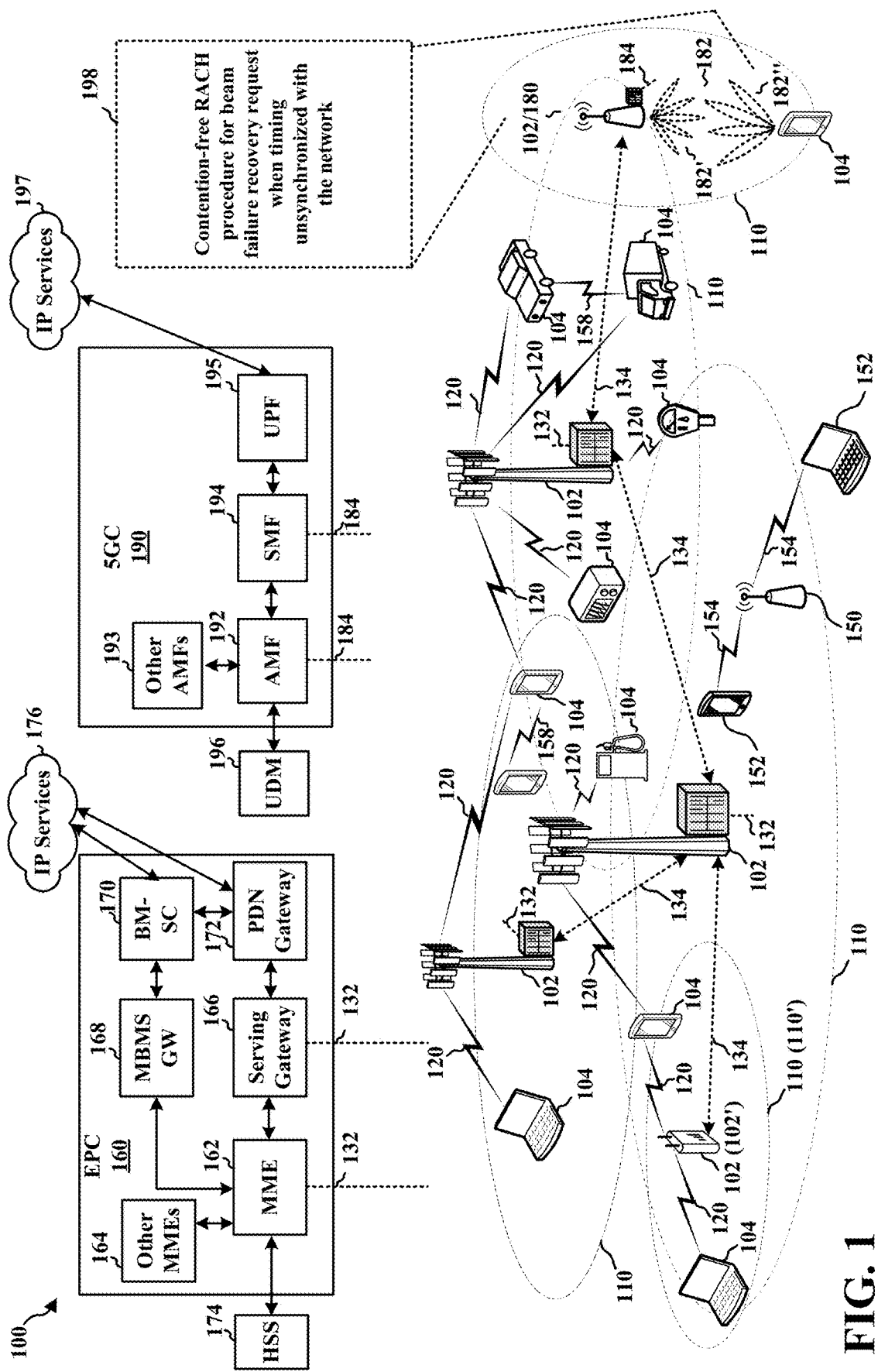
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3

GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G New Radio (NR), the concepts described herein may be applicable to other similar areas, such as LTE, LTE-A, Code Division Multiple Access (CDMA), Global System for Mobile communications (GSM), and/or other wireless/radio access technologies. Referring again to FIG. 1, in certain aspects, during initial access, the UE 104 may be timing unsynchronized with the base station 102/180. Unsynchronized timing between the UE 104 and the base station 102/180 may also be referred to as timing asynchronous, and may indicate the UE 104 is timing unaligned with the base station 102/180. For the UE 104 to communicate with the base station 102/180 on scheduled resources (e.g., for uplink communication), the UE 104 may become timing synchronized with the base station 102/180. Timing synchronization between the UE 104 and the base station 102/180 may also be referred to as timing synchronous, and may indicate the UE 104 is timing aligned with the base station 102/180.

The UE 104 may acquire timing synchronization with the base station 102/180 when timing is synchronized at the base station 102/180—e.g., uplink timing may be aligned relative to downlink timing. According to one configuration, the UE 104 may be timing synchronized with the base station 102/180 when uplink subframes are synchronized with downlink subframes (e.g., within a threshold margin) at the base station 102/180. In one aspect, when the boundaries of at least one of symbols, slots, and/or subframes are aligned (e.g., within a threshold margin) between the base station 102/180 and the UE 104, then the UE 104 may be timing synchronized with the base station 102/180.

The UE 104, however, may lose timing synchronization with the base station 102/180 even after acquiring timing synchronization. For example, uplink timing (e.g., uplink subframes) from the UE 104 may change over time relative to downlink timing (e.g., downlink subframes) at the base station 102/180, e.g., due to various factors or conditions, such as propagation delay. Therefore, the base station 102/180 may facilitate the maintenance of timing synchronization by the UE 104 by providing the UE 104 with a timing advance command, which may be periodically provided to the UE 104 within a duration of a timer (e.g., a timer that may be reset for each timing advance command).

In addition, the UE 104 may become timing unsynchronized with the base station 102/180 due to radio link failure (e.g., when a serving beam via which the UE 104 communicates with the base station 102/180 becomes occluded). To acquire (or reacquire) timing synchronization with the base station 102/180, the UE 104 may perform a random access channel (RACH) procedure. A RACH procedure may be either contention-free or contention-based. Thus, according to various aspects of the present disclosure, the UE 104 may determine whether to perform a contention-free or a contention-based RACH procedure so that the UE 104 may recover from a radio link failure and acquire timing synchronization with the base station 102/180.

The UE 104 may determine whether a beam failure recovery request is to be sent to a base station 102/180 using a contention-free RACH procedure with a dedicated preamble when the UE 104 is timing unsynchronized with the base station 102/180. The UE 104 may send the beam failure recovery request using the contention-free RACH procedure with the dedicated preamble (198) when the beam failure recovery request is determined to be sent to the base station 102/180 using the contention-free RACH procedure with the dedicated preamble. The UE 104 may send the beam failure recovery request using a contention-based RACH procedure when the beam failure recovery request is undetermined to be sent to the network using the contention-free RACH procedure with the dedicated preamble.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology g=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
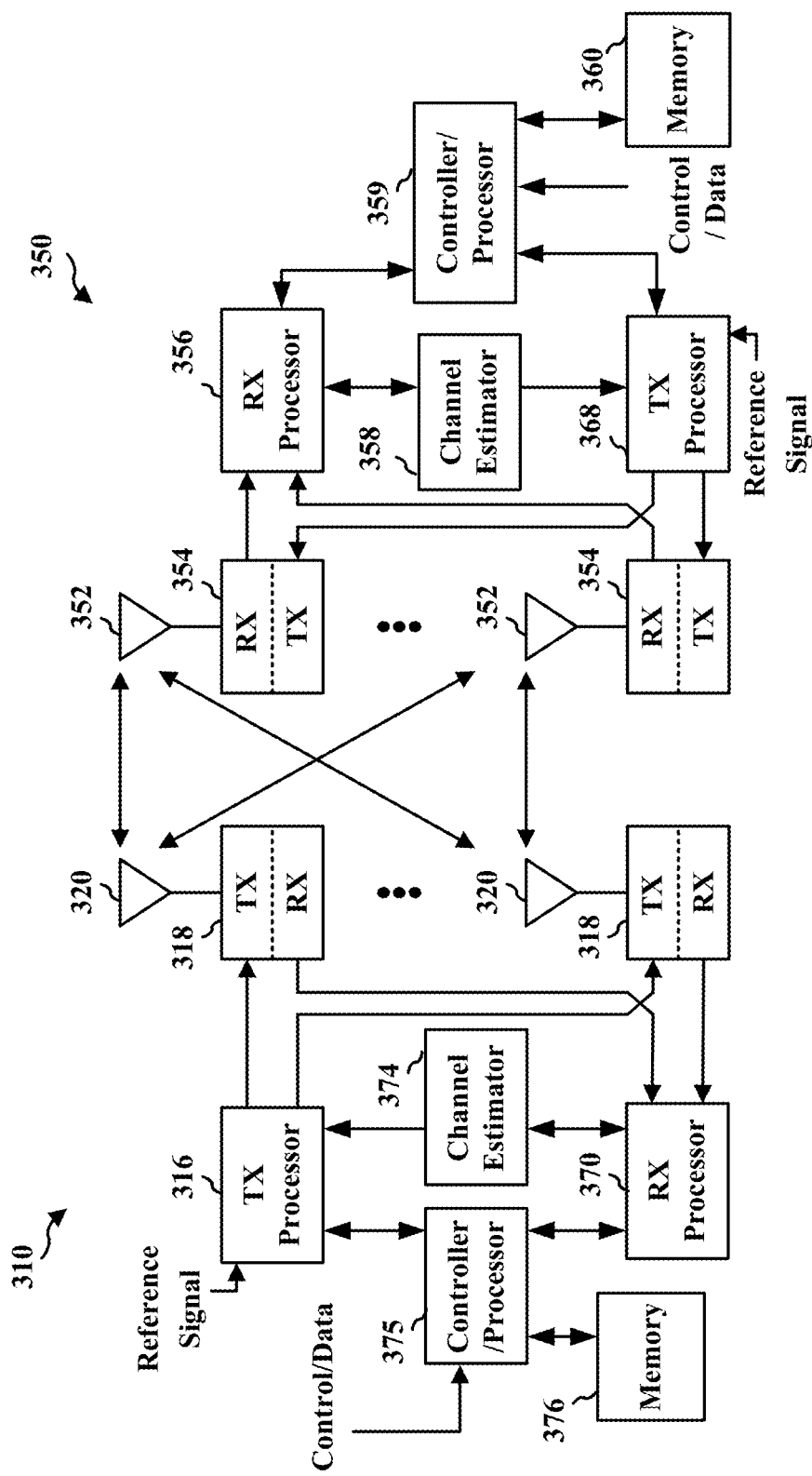
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figures 4A, 4B:
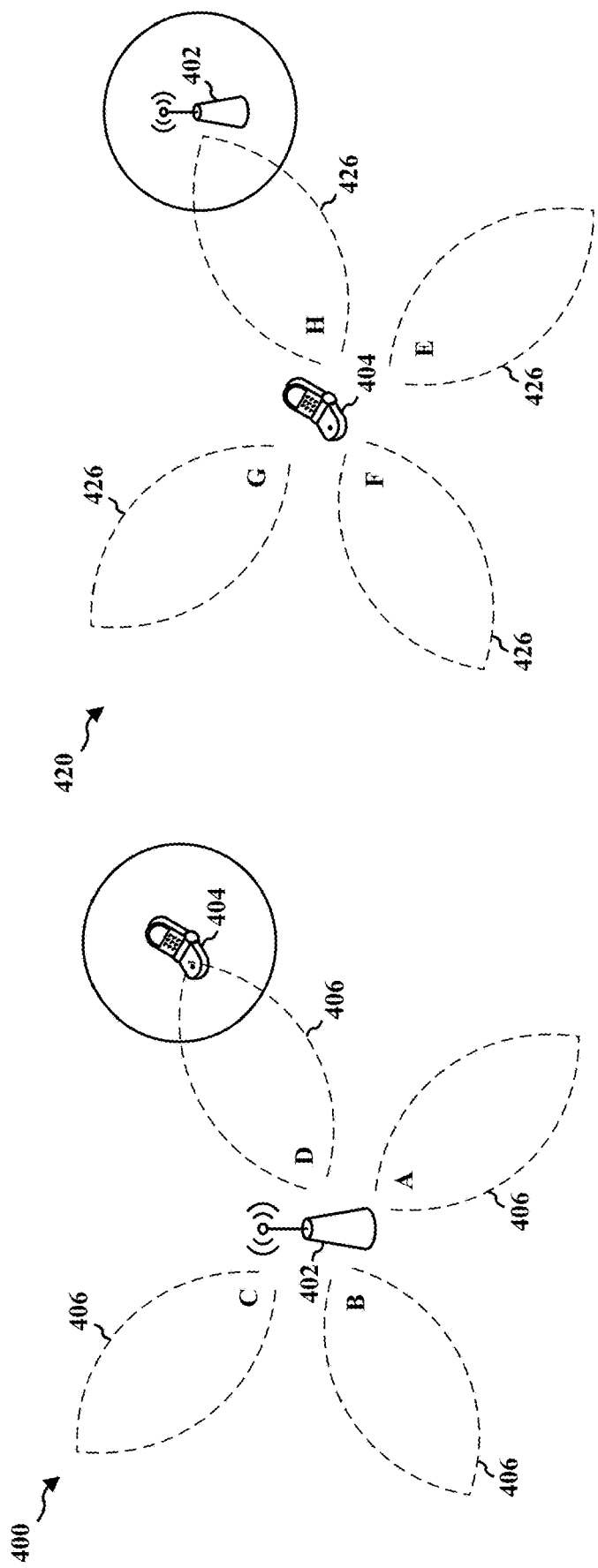
FIGS. 4A and 4B are diagrams of a wireless communications system.

FIGS. 4A and 4B are diagrams illustrating an example of the transmission of beamformed signals between a base station 402 and a UE 404. The base station 402 may be embodied as a base station in a mmW system (mmW base station). The base station 402 may be configured to provide a cell. For example, in the context of FIG. 1, the cell may include a geographic coverage area 110 in which communication coverage is provided and/or a small cell 102' having a coverage area 110'.

First referring to FIG. 4A, a wireless communications system 400 may include a base station 402 of a mmW system transmitting beamformed signals 406 (e.g., beam reference signals) in different transmit directions (e.g., directions A, B, C, and D).

In an example, the base station 402 may sweep through the transmit directions according to a sequence A-B-C-D. In another example, the base station 402 may sweep through the transmit directions according to the sequence B-D-A-C. Although only four transmit directions and two transmit sequences are described with respect to FIG. 4A, any number of different transmit directions and transmit sequences are contemplated.

After transmitting the signals, the base station 402 may switch to a receive mode. In the receive mode, the base station 402 may sweep through different receive directions in a sequence or pattern corresponding (mapping) to a sequence or pattern in which the base station 402 previously transmitted the synchronization/discovery signals in the different transmit directions. For example, if the base station 402 previously transmitted the synchronization/discovery signals in transmit directions according to the sequence A-B-C-D, then the base station 402 may sweep through receive directions according to the sequence A-B-C-D in an attempt to receive an association signal from a UE 404. In another example, if the base station 402 previously transmitted the synchronization/discovery signals in transmit directions according to the sequence B-D-A-C, then the base station 402 may sweep through receive directions according to the sequence B-D-A-C in an attempt to receive the association signal from the UE 404.

A propagation delay on each beamformed signal allows a UE 404 to perform a receive (RX) sweep. The UE 404 in a receive mode may sweep through different receive directions in an attempt to detect a synchronization/discovery signal 406 (see FIG. 4B). One or more of the synchronization/discovery signals 406 may be detected by the UE 404. When a strong synchronization/discovery signal 406 is detected, the UE 404 may determine an optimal transmit direction of the base station 402 and an optimal receive direction of the UE 404 corresponding to the strong synchronization/discovery signal. For example, the UE 404 may determine preliminary antenna weights/directions of the strong synchronization/discovery signal 406, and may further determine a time and/or resource where the base station 402 is expected to optimally receive a beamformed signal. Thereafter, the UE 404 may attempt to associate with the base station 402 via a beamformed signal.

The base station 402 may sweep through a plurality of directions using a plurality of ports in a cell-specific manner in a first symbol of a synchronization subframe. For example, the base station 402 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the base station 402 may sweep the four different transmit directions (e.g., directions A, B, C, and D) in a cell-specific manner using four ports in a second symbol of a synchronization subframe. A synchronization beam may occur in a second symbol of the synchronization subframe.

Next referring to the wireless communications system 420 of FIG. 4B, the UE 404 may listen for beamformed discovery signals in different receive directions (e.g., directions E, F, G, and H). In an example, the UE 404 may sweep through the receive directions according to a sequence E-F-G-H. In another example, the UE 404 may sweep through the receive directions according to the sequence F-H-E-J. Although only four receive directions and two receive sequences are described with respect to FIG. 4B, any number of different receive directions and receive sequences are contemplated.

The UE 404 may attempt the association by transmitting beamformed signals 426 (e.g., association signals or another indication of a best "coarse" beam or a best "fine" beam) in the different transmit directions (e.g., directions E, F, G, and H). In an aspect, the UE 404 may transmit an association signal 426 by transmitting along the optimal receive direction of the UE 404 at the time/resource where the base station 402 is expected to optimally receive the association signal. The base station 402 in the receive mode may sweep through different receive directions and detect the association signal 426 from the UE 404 during one or more timeslots corresponding to a receive direction. When a strong association signal 426 is detected, the base station 402 may determine an optimal transmit direction of the UE 404 and an optimal receive direction of the base station 402 corresponding to the strong association signal. For example, the base station 402 may determine preliminary antenna weights/directions of the strong association signal 426, and may further determine a time and/or resource where the UE 404 is expected to optimally receive a beamformed signal. Any of the processes discussed above with respect to FIGS. 4A and 4B may be refined or repeated over time such that the UE 404 and base station 402 eventually learn the most optimal transmit and receive directions for establishing a link with each other. Such refinement and repetition may be referred to as beam training.

In an aspect, the base station 402 may choose a sequence or pattern for transmitting the synchronization/discovery signals according to a number of beamforming directions. The base station 402 may then transmit the signals for an amount of time long enough for the UE 404 to sweep through a number of beamforming directions in an attempt to detect a synchronization/discovery signal. For example, a base station beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 404 detects a synchronization/discovery signal from the base station 402, the UE 404 may discover that the strongest synchronization/discovery signal is received when the UE 404 beamforming direction is k=2 and the base station 402 beamforming direction is n=3. Accordingly, the UE 404 may use the same antenna weights/directions for responding (transmitting a beamformed signal) to the base station 402 in a corresponding response timeslot. That is, the UE 404 may send a signal to the base station 402 using UE 404 beamforming direction k=2 during a timeslot when the base station 402 is expected to perform a receive sweep at base station 402 beamforming direction n=3.

In an example, the directions A, B, C, and D may correspond to beams. The base station 402 may communicate with the UE 404 through a current serving beam (e.g., direction D). The base station 402 and/or the UE 404 may maintain a list of one or more candidate beams (e.g., direction A) that may replace the serving beam in the event that the current serving beam fails.

Path loss may be relatively high in mmW systems. Transmission may be directional to mitigate path loss. The base station 402 may transmit one or more beam reference signals by sweeping in all directions so that the UE 404 may identify a best "coarse" beam. Further, the base station 402 may transmit a beam refinement request signal so that the UE 404 may track "fine" beams. If a "coarse" beam identified by the UE 404 changes, the UE 404 may need to inform the base station so that the base station may train one or more new "fine" beams for the UE 404.

In various aspects, the UE 404 may communicate with the base station 402 through a serving beam. That is, the UE 404 and the base station 402 may establish and maintain a radio link through a serving beam. However, the serving beam may fail. For example, the UE 404 may measure a block level error rate (BLER) for TBs transmitted by the base station 402. If the BLER fails to satisfy a threshold (e.g., does not meet or does not exceed the threshold), then the UE 404 may detect a radio link failure between the UE 404 and the base station 402. The UE 404 may regard the radio link failure as the failure of the serving beam.

When the UE 404 detects a radio link failure, the UE 404 may send a beam failure recovery request to the base station 402. In some aspects, the UE 404 and/or the base station 402 may maintain a list of candidate beams for communication between the UE 404 and the base station 402. The list of candidate beams may include one or more beam indexes corresponding to one or more beams that may replace the serving beam in the event of a radio link failure. For example, the UE 404 may select a candidate beam, e.g., based on a reference signal received power (RSRP), reference signal received quality (RSRQ), a signal-to-noise ratio (SNR), and/or another measurement from the candidate beam that is monitored by the UE 404. The UE 404 may then send a beam failure recovery request through the candidate beam in order to recover the radio link with the base station 402.

In various aspects, the UE 404 may perform a RACH procedure, as described infra, in order to indicate a beam failure recovery request to the base station 402. If the UE 404 maintains timing synchronization with the base station 402, then the UE 404 may perform a contention-free RACH procedure with the base station 402 in order to convey a beam failure recovery request.

However, the UE 404 may lose timing synchronization with the base station 402 in the event of a radio link failure. If the UE 404 becomes timing unsynchronized with the base station 402, then the UE 404 may be unable to perform a contention-free RACH procedure because the preamble transmission of the contention-free RACH procedure potentially may interfere with other UEs (e.g., timing synchronized UEs). Consequently, the UE 404 would perform a contention-based RACH procedure in order to reestablish a radio link with the base station 402.

The contention-based RACH procedure may incur additional overhead (e.g., latency) over the contention-free RACH procedure and, therefore, there exists a need for an approach to beam failure recovery for timing unsynchronized UEs that reduces the additional overhead commensurate with the contention-based RACH procedure. The present disclosure may provide an approach to beam failure recovery in which timing unsynchronized UEs are able to perform a contention-free RACH procedure in order to convey a beam failure recovery request to the network.

FIGS. 5A and 5B illustrate call flow diagrams of a contention-based RACH procedure 500 and a contention-free RACH procedure 540, respectively. The base station 502 may be configured to provide a cell. For example, in the context of FIG. 1, the cell may include a geographic coverage area 110 in which communication coverage is provided and/or a small cell 102' having a coverage area 110'.

A UE 504 may perform a RACH procedure 500, 540 with a base station 502 (e.g., a mmW base station, an eNB, a gNB, etc.), for example, in order to synchronize with a network. A RACH procedure may be either contention-based or contention-free. In either RACH procedure 500, 540, a RACH preamble may be used, e.g., to differentiate messages from different UEs.

In various aspects, a sequence may be used to transmit a RACH preamble. The sequence may be a Zadoff-Chu sequence. The number of orthogonal or separable Zadoff-Chu sequences that may occupy a set of time/frequency resources allocated for a RACH procedure (e.g., a RACH region) may be dependent upon the available number of cyclic shifts associated with a Zadoff-Chu sequence. For example, the base station 502 may configure a particular number of cyclic shifts $N_{CS}$, a starting root sequence configuration (e.g., root sequence index), and a maximum number of preambles in a cell provided by the base station 502.

The number of cyclic shifts $N_{CS}$ may refer to the minimum gap between two cyclic shift values that are to be used in a cell. The number of cyclic shifts $N_{CS}$ may be related to the maximum number of cyclic shift values that can be supported for each starting root sequence. For example, for a length 139 Zadoff-Chu sequence, the base station 502 may, for a cell, configure the number of cyclic shifts $N_{CS}$ to be 4 (e.g., indicated by a zeroCorrelationZoneConfig value of 1). Therefore, the cell may support a maximum of [139/4], or 34 cyclic shift values for each starting root sequence. However, the base station 502 may configure the cell to support 64 preambles.

The base station 502 may send a set of RACH parameters associated with RACH preambles, and the UE 504 may receive the set of RACH parameters. In one aspect, the base station 502 may broadcast the set of RACH parameters in a SIB—e.g., a set of RACH parameters associated with a contention-based RACH procedure for initial access, handover, etc. may be broadcast. In one aspect, the base station 502 may send the set of RACH parameters via RRC signaling—e.g., a set of RACH parameters associated with a RACH procedure (e.g., contention-free and/or contention-based) may be signaled in one or more RRC messages.

In an aspect, the set of RACH parameters may indicate a root sequence index. The root sequence index may include a starting root index or logical root sequence number. The UE 504 may generate a RACH preamble sequence based on the starting root index or logical root sequence number.

In an aspect, the set of RACH parameters may indicate a number of available cyclic shifts $N_{CS}$. The number of available cyclic shifts $N_{CS}$ may be indicated through a zeroCorrelationZoneConfig (ZCZC) value. The UE 504 may apply one or more cyclic shifts to a sequence, e.g., in order to separate the sequence from other sequences in the cell.

Based on the root sequence index and the available number of cyclic shifts $N_{CS}$, the UE 504 may generate a set of sequences. For example, the UE 504 may generate each sequence up to the number of RACH preambles supported in the cell provided by the base station 502—e.g., the UE 504 may generate 64 sequences. In one aspect, the UE 504 may generate each sequence of the set of sequences by generating a base sequence (e.g., Zadoff-Chu sequence) using the starting root sequence index indicted by the set of RACH parameters, and then applying cyclic shifts to the base sequence until the maximum number of sequences supported in the cell are found (e.g., 64 sequences). If the maximum number of sequences supported in the cell cannot be generated from the base sequence, the UE 504 may similarly generate the remaining sequences using at least one root sequence that corresponds to the next consecutive logical root sequence index.

The set of RACH parameters may indicate additional information. For example, the set of RACH parameters may indicate a received target power associated with a RACH procedure (e.g., the power with which the base station 502 requests to receive a RACH preamble). The set of RACH parameters may indicate a number of maximum preamble transmissions associated with a RACH procedure (e.g., a threshold maximum number of times the UE 504 may attempt transmission of a RACH preamble without receiving a response from the base station). The set of RACH parameters may indicate a power ramping step associated with a RACH procedure (e.g., an amount of additional power to be used by the UE 504 for each successive RACH preamble transmission attempt). The set of RACH parameters may indicate a candidate beam threshold for a RACH procedure (e.g., a threshold for an RSRP or RSRQ measured for a candidate beam that is to be satisfied in order for the UE 504 to attempt a RACH procedure through that candidate beam). The set of RACH parameters may indicate a PRACH frequency offset associated with a RACH procedure (e.g., a frequency position that the UE 504 is to use for RACH preamble transmission). The set of RACH parameters may indicate a candidate beam reference signal list (e.g., a list of reference signal indexes in which each entry indicates a synchronization signal block or a CSI-RS resource index).

In some aspects, the set of RACH parameters may include one or more additional parameters. In other aspects, one or more of the aforementioned RACH parameters may be absent (e.g., one or more RACH parameters may be applicable to a RACH procedure to convey a beam failure recovery request, but inapplicable for initial access or handover).

In an aspect, the set of RACH parameters may indicate configuration information (e.g., a configuration index) associated with a RACH procedure. The configuration information may indicate resource(s) that are to carry a RACH preamble (e.g., a RACH region). The configuration information may indicate an SFN, a preamble format, a subframe index, etc.

In an aspect, the base station 502 may configure two sets of RACH parameters for UEs in a cell provided by the base station. For example, the base station 502 may configure a first set of RACH parameters for initial access, cell selection, cell reselection, handover, etc. In one aspect, the first set of RACH parameters may be used for a contention-based RACH procedure. In one aspect, the first set of RACH parameters may be used for UEs that are timing unsynchronized in the cell when those UEs are unable to perform a contention-free RACH procedure to convey a beam failure recovery request.

The base station 502 may configure a second set of RACH parameters for beam failure recovery. For example, the second set of RACH parameters may be used by UEs in the cell when those UEs experience a radio link failure with the base station 502 (e.g., loss of a serving beam).

In one aspect, resources allocated for a contention-based RACH procedure may at least partially overlap with resources allocated for a beam failure recovery request conveyed through RACH. For example, the RACH region that is to carry RACH preambles for initial access, cell selection, cell reselection, handover, and/or loss of timing synchronization may at least partially overlap with a set of resources on which a RACH preamble(s) to convey a beam failure recovery request is carried. In case of this overlap, the RACH region that is to carry RACH preambles for initial access, cell selection, cell reselection, handover, and/or loss of timing synchronization may be frequency-division multiplexed with the set of resources on which the RACH preamble to convey a beam failure recovery request is carried.

In one aspect, RACH preambles for initial access, cell selection, cell reselection, handover, and/or loss of timing synchronization may be code-division multiplexed with RACH preambles used to convey a beam failure recovery request. That is, the base station 502 may design or configure the sequence for initial access, cell selection, cell reselection, handover, and/or loss of timing synchronization (e.g., contention-based RACH procedure preambles) to be the same as the sequence for requesting beam failure recovery. For example, within a RACH region, the base station 502 may configure a first set of RACH preambles for initial access, cell selection, cell reselection, handover, and/or loss of timing synchronization and a second set of RACH preambles for requesting a beam failure recovery. By way of example, the base station 502 may assign 48 of a maximum 64 RACH preambles for UEs that are to perform RACH for initial access, cell selection, cell reselection, handover, and/or loss of timing synchronization, and may assign the remaining 16 RACH preambles for UEs that may convey a beam failure recovery request.

In one aspect, one or more parameters may be different between the first set of RACH parameters and the second set of RACH parameters. For example, at least one of the number of available cyclic shifts $N_{CS}$ (as indicated by ZCZC value) and/or the root sequence index may be different between the first set of RACH parameters and the second set of RACH parameters. For example, the number of available cyclic shifts $N_{CS}$ may be greater for the second set of RACH parameters because the minimum gap between two successive RACH preambles may be smaller for timing synchronized UEs. In some aspects, the range of one or more parameters may be the same between the first set of RACH parameters and the second set of RACH parameters, even though the individual parameter(s) may be different.

FIG. 5A illustrates a method for a contention-based RACH procedure 500. The contention-based RACH procedure may occur on the PRACH, e.g., as described with respect to FIG. 2D, supra.

In aspects, the UE 504 may select a RACH preamble for the RACH procedure. For example, the UE may generate a plurality of sequences for a RACH preamble based on a root sequence index and a number of available cyclic shifts $N_{CS}$, as described, supra. The UE 504 may then select one of the generated sequences for the RACH preamble. In an aspect, this selection may be random.

Further, the UE 504 may determine a random access (RA) RNTI in order to identify the UE 504 during the RACH procedure. The UE 504 may determine an RA-RNTI based on, for example, a time slot number in which a MSG1 510 is sent. The UE 504 may include the RACH preamble and the RA-RNTI in the MSG1 510.

In an aspect, the UE 504 may determine at least one resource (e.g., a time and/or frequency resource) that is to carry the MSG1 510. For example, the base station 502 may broadcast system information (e.g., a SIB), and the UE 504 may acquire the at least one resource based on the system information (e.g., system information included in a SIB2). The UE 504 may send the MSG1 510 to the base station 502, for example, on the at least one resource.

Based on the MSG1 510, the base station 502 may send, to the UE 504, a MSG2 512. The MSG2 512 may also be known as a random access response and may be sent on a downlink shared channel (DL-SCH). The base station 502 may determine a temporary cell RNTI (T-CRNTI). In addition, the base station 502 may determine a timing advance value so that the UE 504 may adjust timing to compensate for delay. Further, the base station 502 may determine an uplink resource grant, which may include an initial resource assignment for the UE 504 so that the UE 504 may use the uplink shared channel (UL-SCH).

The base station 502 may generate the MSG2 512 to include the T-CRNTI, the timing advance value (e.g., 12-bit timing advance command), and/or the uplink grant resource. The base station 502 may then transmit the MSG2 512 to the UE 504. When the UE 504 receives and decodes the MSG2 512, the UE 504 may determine an uplink resource grant and a timing advance.

Based on the MSG2 512, the UE 504 may send, to the base station 502, a MSG3 514. The MSG3 514 may also be known as an RRC connection request message and/or a scheduled transmission message. The UE 504 may determine a temporary mobile subscriber identity (TMSI) associated with the UE 504 or another random value used to identify the UE 504 (e.g., if the UE 504 is connecting to the network for the first time). The UE 504 may determine a connection establishment clause, which may indicate why the UE 504 is connecting to the network. The UE 504 may generate the MSG3 514 to include at least the TMSI or other random value, as well as the connection establishment clause. The UE 504 may include information on a PUSCH in the MSG3 514. The UE 504 may then transmit the MSG3 514 to the base station on the UL-SCH.

Based on the MSG3 514, the base station 502 may send a MSG4 516 to the UE 504. The MSG4 516 may also be known as a contention resolution message. The base station 502 may address the MSG4 516 toward the TMSI or random value from the MSG3 514. The base station 502 may transmit the MSG4 516 to the UE 504. The UE 504 may decode the MSG4 516. This contention-based RACH procedure may allow the UE 504 to acquire timing synchronization with a network, e.g., for uplink communication by the UE 504.

FIG. 5B illustrates a method of a contention-free RACH procedure 540. The contention-free RACH procedure may occur on a non-contention based channel that is based on the PRACH (see, e.g., FIG. 2D), and may use resource(s) that are orthogonal to resource(s) of other PRACH transmissions, e.g., for frequency-division multiplexing.

The contention-free RACH procedure may be used for, inter alia, beam failure recovery. For example, UEs that are timing synchronized with the base station 502 may perform a contention-free RACH procedure in order to convey a beam failure recovery request. In some aspects, UEs that are timing unsynchronized with the base station 502 may perform a contention-free RACH procedure in order to convey a beam failure recovery request to the base station 502, e.g., if certain conditions are satisfied.

The base station 502 may determine a RACH preamble assigned to the UE 504. The base station 502 may transmit, to the UE 504, the RACH preamble assignment 542. The RACH preamble assignment 542 may indicate a dedicated preamble; that is, a RACH preamble that is dedicated to the UE 504 for a contention-free RACH procedure.

When the UE is to perform a contention-free RACH procedure, the UE 504 may send the RACH preamble 544 to the base station 502 based on the RACH preamble assignment 542. In one aspect, the UE 504 may sent the RACH preamble 544 to the base station 502 as an RRC connection message. In one aspect, the UE 504 may send the RACH preamble 544 to the base station 502 in order to convey a beam failure recovery request.

The UE 504 may then receive, from the base station 502, a RACH response 546 (e.g., an uplink grant). In some aspects, the RACH response 546 may indicate a timing advance. In one aspect, the timing advance indicated by the RACH response 546 may be comparatively smaller than the timing advance indicated by the MSG2 512 in the contention-based RACH procedure because the UE 504 performing the contention-free RACH procedure may be already timing synchronized with the base station 502.

Figure 6:
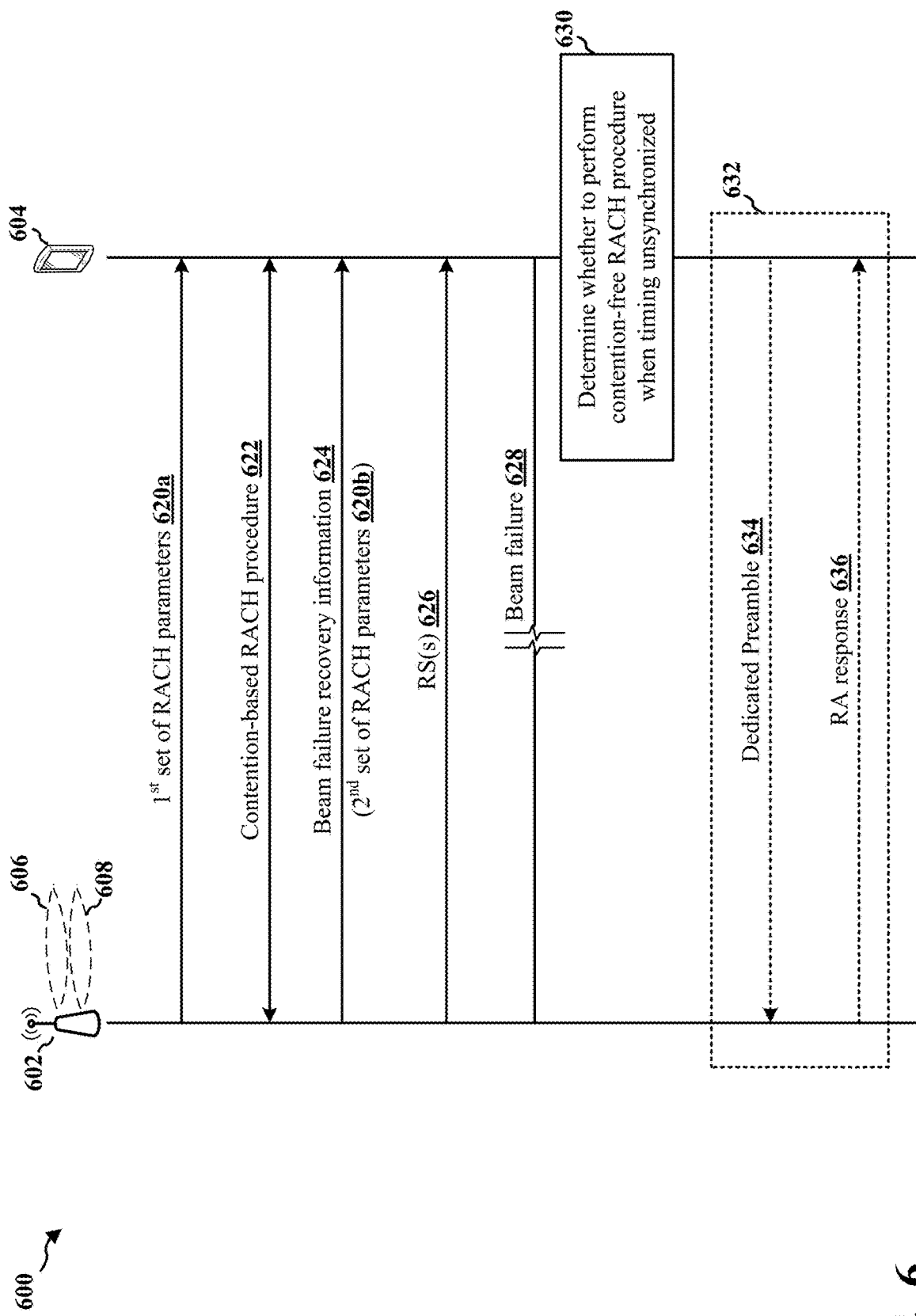
FIG. 6 is a diagram of a call flow of a wireless communications system.

FIG. 6 is a call flow diagram illustrating the acquisition of timing synchronization 600 in a wireless communications system by a UE 604 with a base station 602, e.g., during initial access and again after a radio link failure. In the context of FIGS. 1-5A and 5B, the UE 604 may be embodied as one or more of the UE 104, the UE 350, the UE 404, and/or the UE 504. Further, the base station 602 may be embodied as one or more of the base station 102, the base station 180, the base station 310, the base station 402, and/or the base station 502. The base station 602 may be configured to provide a cell, on which the UE 604 may operate. For example, in the context of FIG. 1, the cell may include a geographic coverage area 110 in which communication coverage is provided and/or a small cell 102' having a coverage area 110'.

For UEs to operate on the cell, the base station 602 may configure a first set of RACH parameters 620a for initial access, cell selection, cell reselection, handover, etc. In one aspect, the first set of RACH parameters 620a may be used for a contention-based RACH procedure. Further, the first set of RACH parameters 620a may be used for some UEs that are timing unsynchronized in the cell, such as when those UEs are unable to perform a contention-free RACH procedure to convey a beam failure recovery request. The base station 602 may send (e.g., broadcast) the first set of RACH parameters 620a, e.g., in one or more SIBs.

Additionally, the base station 602 may configure a second set of RACH parameters 620b for beam failure recovery. For example, the second set of RACH parameters 620b may be used by UEs in the cell when those UEs experience a radio link failure with the base station 602 (e.g., loss of a serving beam). The first and second sets of RACH parameters 620a, 620b may include one or more of the same type of RACH parameters; however, one or more of the second set of RACH parameters 620b may be different from a corresponding one or more of the first set of RACH parameters 620a.

When the UE 604 enters and/or initially accesses the cell provided by the base station 602, the UE 604 may receive at least one SS/PBCH block (e.g., as described with respect to FIG. 2B, supra). The UE 604 may acquire downlink synchronization from the at least one SS/PBCH block and, after acquiring downlink synchronization, the UE 604 may detect system information (e.g., one or more SIBs) broadcast in the cell by the base station 602.

The UE 604 may detect the one or more SIBs, and may decode the one or more SIBs to obtain the first set of RACH parameters 620a. The UE 604 may perform a contention-based RACH procedure 622 with the base station 602. For example, during initial access or handover, the UE 604 may perform the contention-based RACH procedure 622. The UE 604 may use the first set of RACH parameters 620a when performing the contention-based RACH procedure 622. For example, the UE 604 may generate a contention-based RACH preamble using the first set of RACH parameters 620a, and the UE 604 may send the contention-based RACH preamble to the base station 602 to initiate the contention-based RACH procedure 622. Referring to FIG. 5A, for example, the UE 604 may perform the contention-based RACH procedure 500, as described with respect to the UE 504.

From the contention-based RACH procedure 622, the UE 604 may acquire timing synchronization with the base station 602. In addition, the UE 604 may determine a serving beam 606 for communication with the base station 602. According to one aspect, the UE 604 may determine the serving beam 606 for one direction of communication with the base station 602, such as uplink communication. A second beam may be configured for the other direction of communication (e.g., downlink communication), which may be the same or different from the serving beam 606.

For the cell, the base station 602 may configure parameters for beam failure recovery requests from UEs. For example, the base station 602 may configure at least one set of resources for transmission of dedicated preambles to indicate a beam failure recovery request in a contention-free RACH procedure. The base station 602 may configure a set of RACH resources to be associated with the candidate beam 608, e.g., a set of RACH resources may be associated with the candidate beam 608 through an ID of at least one of the RSs 626 communicated via the candidate beam 608.

In some aspects, a set of resources configured for transmission of dedicated preambles may include a RACH subcarrier region, which also may be associated with contention-based RACH procedures for initial access or handover. For example, a set of resources allocated for transmission of dedicated preambles to indicate a beam failure recovery request may be frequency-division multiplexed with another set of resources associated with a contention-based RACH procedure (e.g., for initial access, handover, etc.).

In another aspect, dedicated preambles may be code-division multiplexed with a plurality of other preambles associated with a contention-based RACH procedure (e.g., the root sequence indexes and/or ZCZC values may be the same for a dedicated preamble and a contention-based RACH procedure preamble). The base station 602 may configure contention-based RACH preambles (e.g., root sequences and/or ZCZC parameters) such that the base station 602 may successfully decode preambles of contention-based RACH procedures (e.g., for timing unsynchronized UEs performing initial access or handover in the cell). In so doing, the base station 602 may also be able to successfully decode preambles of contention-free RACH procedures from timing unsynchronized UEs that are conveyed to indicate beam failure and that fall in the same RACH occasion(s) as other preambles of contention-based RACH procedures.

In some aspects, the root sequence and/or ZCZC parameters assigned for the dedicated contention-free RACH preambles that are code-division multiplexed with contention-based RACH preambles may be same as (or at least partially overlap with) those of contention-based RACH preamble. In some aspects, the base station 602 may configure the root sequences and/or ZCZC parameters for contention-based RACH preambles so that the base station 602 may successfully decode contention-based RACH preambles of UEs without uplink timing alignment that are performing RACH for initial access and handover. The base station 602 may successfully decode contention-free RACH preambles (e.g., in the same RACH occasion as contention-based RACH preambles) that are transmitted by UEs without uplink timing alignment to convey a beam failure recovery request. Therefore, when the UE 604 is assigned a dedicated contention-free RACH preamble to indicate a beam failure, the UE 604 may be allowed to perform the contention-free RACH procedure if the UE 604 is uplink timing aligned with the base station 602 and/or if the allocated contention-free RACH preamble falls in the same RACH occasion as that allocated for contention-based RACH preambles. Thus, when the UE 604 is assigned a dedicated contention-free RACH preamble to indicate beam failure, the UE 604 may perform a contention-free RACH procedure to convey a beam failure recovery request if the UE 604 is uplink timing aligned with the base station 602 or if the allocated contention-free RACH preamble falls in the same RACH occasion that contains one or more contention-based RACH preambles.

When operating on the cell provided by the base station 602, the UE 604 may receive, from the base station 602, information 624 associated with a beam failure recovery request. The information 624 may include the second set of RACH parameters 620b, which may include RACH parameters associated with a beam failure recovery request to be sent to the base station 602.

The base station 602 may send the information 624 to the UE 604 via RRC signaling. In one aspect, the base station 602 may send the information 624 to the UE 604 in one RRC message. In another aspect, the base station 602 may send a first portion of the information 624 to the UE 604 in a first RRC message, and may send a second portion of the information 624 to the UE 604 in one or more other RRC messages.

The information 624 may include one or more parameters based on which the UE 604 may determine (e.g., generate or select) a dedicated preamble. In one aspect, the one or more parameters may include at least one preamble index, such as a preamble index. The preamble index may be associated with a beam corresponding to an RS, such as an SS/PBCH block and/or a CSI-RS. An RS may be associated with an ID and, therefore, a beam via which the RS is received may correspond to the RS ID, e.g., an SS/PBCH block ID and/or a CSI-RS ID defined in a measurement object associated with the cell provided by the base station 602. In another aspect, the information 624 may include a root sequence index (e.g., a starting logical root sequence) and/or a ZCZC value, which may be used by the UE 604 to generate a contention-free RACH preamble.

Further, the information 624 (e.g., the second set of RACH parameters 620b) may indicate a power for transmission of a dedicated preamble, a set of RACH occasions for transmission of a dedicated preamble, a maximum number of RACH preamble transmissions, a power-ramping factor, a frequency offset associated with frequency-division multiplexing with one or more other RACH resources, and/or one or more masks for RACH resources and/or RSs (e.g., SS/PBCH blocks).

Potentially, the serving beam 606 may fail and therefore the information 624 may indicate at least one threshold (e.g., an RSRP threshold) for selection of a candidate beam on which an RS is received, a list of RSs corresponding to candidate beams associated with beam failure recovery, one or more RACH resources associated with one or more beams, and/or at least one dedicated preamble associated with at least one beam for beam failure recovery. In some aspects, the information 624 may identify a candidate beam through an ID of an RS communicated via a beam. For example, the information 624 may identify the candidate beam 608 based on an ID of at least one of the RSs 626 communicated via the candidate beam 608.

While operating on the cell provided by the base station 602, the UE 604 may receive RSs through a set of beams different from the serving beam 606. The RSs may include at least one CSI-RS and/or SS/PBCH block. For example, the UE 604 may receive a set of SS/PBCH blocks and/or a set of CSI-RSs via a set of beams, and a respective SS/PBCH block of the set of SS/PBCH blocks and/or a respective CSI-RS of the set of CSI-RSs may correspond to a beam of the set of beams. Illustratively, the UE 604 may receive one or more RSs 626 via the candidate beam 608. According to one configuration, RSs 626 may be quasi-colocated (e.g., a CSI-RS may be quasi-colocated with an SS/PBCH block).

In various aspects, the UE 604 may measure one or more measurements indicative of channel quality based on received RSs—e.g., the UE 604 may measure a respective RSRP, RSRQ, and/or SNR for a respective beam of a set of beams via which a respective RS of the RSs is communicated. For example, the UE 604 may measure an RSRP of an RS of the RSs 626 received via the candidate beam 608. Thus, while the UE 604 may be configured to communicate with the base station 602 via the serving beam 606, the UE 604 measure one or more channel quality measurements based on RSs (e.g., RSs 626) received through one or more other beams (e.g., the candidate beam 608).

The UE 604 may store and maintain a list of candidate beams, which may include at least the candidate beam 608. The list of candidate beams may be configured to include a set of beams different from the serving beam 606 that correspond to the "best" or "strongest" measurements indicative of channel quality. In one aspect, the UE 604 may configure the list of candidate beams to include a set of candidate beams corresponding to the highest channel quality measurements measured for RSs communicated via the set of beams. For example, the UE 604 may compare the channel quality measurements corresponding to the set of beams to one another, and may determine the X best channel quality measurements based on the comparison (e.g., X may be predetermined or may be configured by the base station 602). The UE 604 may then determine the list of candidate beams to include X candidate beams corresponding to the X best channel quality measurements.

In another aspect, the UE 604 may be configured by the base station 602 with the list of candidate beams. For example, the UE 604 may send, to the base station 602, information indicating one or more channel quality measurements measured based on RSs received through the set of beams. The base station 602 may compare the indicated channel quality measurements corresponding to the set of beams to one another, and may determine the X best channel quality measurements based on the comparison (e.g., X may be predetermined or may be configured). The base station 602 may then determine the list of candidate beams to include X candidate beams corresponding to the X best channel quality measurements. The base station 602 may indicate the list of candidate beams, including at least the candidate beam 608, to the UE 604.

When the UE 604 is timing synchronized with the base station 602, the UE 604 may experience and detect a failure 628 of the serving beam 606. In some aspects, the UE 604 may detect the failure 628 of the serving beam 606 at the PHY layer. The PHY layer may signal the detection of the failure 628 to another layer (e.g., the MAC layer of the UE 604), which may trigger operations for beam failure recovery (e.g., a contention-free RACH procedure).

According to one aspect, the UE 604 may detect the beam failure 628 based on a BLER. The UE 604 may measure a BLER as the UE 604 receives (or fails to receive) TBs on the serving beam 606 and, therefore, the BLER may be associated with the serving beam 606. The UE 604 may compare the measured BLER to a BLER-associated threshold, and the UE 604 may detect the failure 628 of the serving beam 606 based on the comparison of the BLER to the BLER-associated threshold (e.g., a BLER that meets or exceeds the BLER-associated threshold may indicate beam failure 628).

In another aspect, the BLER may be hypothetical or estimated. For example, the UE 604 may estimate or hypothesize the BLER based on a signal-to-interference-plus-noise ratio (SINR) and/or based on one or more cyclic redundancy check (CRC) values included in the one or more TBs received by the UE 604. For example, the BLER may be estimated to be relatively high when the number of TBs that do not pass CRC validation is relatively high (e.g., meets or exceeds a CRC-associated threshold) and/or when the SINR is relatively low (e.g., fails to meet or exceed a SINR-associated threshold). Similarly, the BLER may be estimated to be relatively low when the number of TBs that pass CRC validation is relatively low (e.g., does not meet or exceed a CRC-associated threshold) and/or when the SINR is relatively high (e.g., meets or exceeds a SINR-associated threshold).

When the beam failure 628 occurs, the UE 604 may determine that a RACH procedure 632 is to be performed. The RACH procedure 632 may be either contention-free or contention-based, and the UE 604 may determine 630 whether the RACH procedure 632 should be contention-free or contention-based. The UE 604 may recover the radio link with the base station 602 (e.g., via the candidate beam 608) through the RACH procedure 632. If lost, the UE 604 may additionally reacquire timing synchronization with the base station 602 through the RACH procedure 632 (e.g., the UE 604 may not necessarily lose timing synchronization with the base station 602 due to the beam failure 628).

According to various aspects, the UE 604 may become timing unsynchronized with the base station 602 when boundaries of at least one of symbols, slots, subframes, or any combination thereof are unaligned between the UE 604 and the base station 602. The UE 604 may become timing unsynchronized with the base station 602 when a timing offset between the UE 604 and the base station 602 satisfies (e.g., meets or exceeds) a timing-offset threshold.

In some aspects, the UE 604 may determine whether the UE 604 is timing unsynchronized with the base station 602 when experiencing the failure 628 of the serving beam 606. For example, the UE 604 may measure the timing offset, e.g., between subframes, and the UE 604 may determine the UE 604 is timing unsynchronized when the timing offset satisfies the timing-offset threshold. The base station 602 may configure the timing-offset threshold for the UE 604 (e.g., by signaling a value indicating the timing-offset threshold to the UE 604). For example, the base station 602 may signal the timing-offset threshold to the UE 604 through a MIB, SIB, remaining minimum system information (RMSI), DCI, MAC control element (CE), and/or a handover command.

In some other aspects, the base station 602 may determine whether the UE 604 is timing unsynchronized with the base station 602. For example, the base station 602 may measure the timing offset, e.g., between subframes, and the base station 602 may determine the UE 604 is timing unsynchronized when the timing offset satisfies the timing-offset threshold. The base station 602 may indicate, to the UE 604, that the UE 604 is timing unsynchronized when the base station 602 determines the UE 604 is timing unsynchronized.

Potentially, the timing synchronization with the base station 602 may be maintained even during the beam failure 628. For example, the base station 602 may signal a timing advance command to the UE 604, which may instruct the UE 604 to adjust uplink timing relative to downlink timing by a timing advance. To maintain the timing synchronization, the base station 602 may periodically send the timing advance command to the UE 604. In order to maintain timing synchronization, the UE 604 may receive each timing advance command within a threshold time period from the previous timing advance command, as measured by a timer, e.g., timeAlignmentTimer. The timer may be configurable and used to control the duration that the UE 604 is timing synchronized with the base station 602. The value of the timer may be UE-specific (e.g., configured through dedicated signaling) or cell-specific. The base station 602 may signal, to the UE 604, a timer value—e.g., in a SIB, such as a SIB2, which may indicate a UE-specific configurable timer in a timeAlignmentTimerDedicated field or information element, and/or a cell-specific configurable timer in a timeAlignmentTimerCommon field or information element.

The UE 604 may restart the timer when the UE 604 receives a new timing advance (e.g., indicated in a timing advance command) from the base station 602. The base station 602 may continuously measure timing of uplink signals from the UE 604 and may adjust the uplink transmission timing at the UE 604 by sending a timing advance command to the UE 604. If the UE does not received a timing advance command when the timer expires, then the UE 604 may determine that the UE 604 is timing unsynchronized with the base station 602. In some aspects, the UE 604 may be timing unsynchronized when the timer (e.g., timeAlignmentTimer) is not configured for the UE 604.

If the UE 604 is timing synchronized with the base station 602, then the UE 604 may send a beam failure recovery request using a contention-free RACH procedure with the dedicated preamble 634. For example, if the UE 604 is able to recover the radio link through the RACH procedure 632 before expiration of the timer (e.g., timeAlignmentTimer), then the timing advance applied by the UE 604 may remain valid for timing synchronization, and the UE 604 may perform the RACH procedure 632 as contention-free by first sending the dedicated preamble 634.

If the UE 604 is timing unsynchronized, then the UE 604 may attempt to contemporaneously recover the radio link and the timing synchronization with the base station 602. The UE 604 may determine 630 whether a beam failure recovery request is to be sent to the base station 602 using a contention-free RACH procedure with a dedicated preamble when the UE 604 detects both loss of timing synchronization with the base station 602 and failure 628 of the serving beam 606.

According to one configuration, the UE 604 may determine 630 whether the beam failure recovery request is to be sent to the base station 602 using the contention-free RACH procedure with the dedicated preamble by determining whether a first set of resources allocated to the UE 604 in association with a contention-free RACH dedicated preamble at least partially overlaps with a second set of resources allocated by the base station 602 for a contention-based RACH procedure (e.g., the contention-based RACH procedure 622). In one aspect, the first set of resources may be associated with a first RACH occasion (e.g., a set of time-frequency resource(s) on which a RACH preamble may be sent) and the second set of resources may be associated with a second RACH occasion.

If the first set of resources at least partially overlaps with the second set of resources, then the UE 604 may determine 630 to perform the RACH procedure 632 that is contention-free in order to indicate a beam failure recovery request. Otherwise, the UE 604 may determine 630 to perform the RACH procedure 632 that is contention-based in order to indicate a beam failure recovery request.

According to another configuration, the UE 604 may determine whether the beam failure recovery request is to be sent to the base station 602 using the contention-free RACH procedure with the dedicated preamble by determining whether a first ZCZC value associated with the dedicated preamble is equal to a second ZCZC value associated with the contention-based RACH procedure. In one aspect of such a configuration, a set of resources associated with a contention-free RACH procedure with a dedicated preamble may be frequency-division multiplexed with a contention-based RACH procedure. The first ZCZC value may be signaled to the UE 604 in the second set of RACH parameters 620*b* and the second ZCZC value may be signaled to the UE 604 in the first set of RACH parameters 620*a*.

If the first ZCZC value matches (e.g., is equal to) the second ZCZC value, then the UE 604 may determine 630 to perform the RACH procedure 632 that is contention-free in order to indicate a beam failure recovery request. Otherwise, the UE 604 may determine 630 to perform the RACH procedure 632 that is contention-based in order to indicate a beam failure recovery request.

In another configuration in which the first ZCZC value may match the second ZCZC value, the UE 604 may determine whether a first root sequence index associated with the dedicated preamble matches (e.g., is equal to) a second root sequence index associated with the contention-based RACH procedure. In one aspect of such a configuration, a set of resources associated with a contention-free RACH procedure with a dedicated preamble may be frequency-division multiplexed with a set of resources associated with a contention-based RACH procedure. The first root sequence index may be signaled to the UE 604 in the second set of RACH parameters 620b and the second root sequence index may be signaled to the UE 604 in the first set of RACH parameters 620a.

If the first root sequence index matches the second root sequence index (and the first ZCZC value matches the second ZCZC value), then the UE 604 may determine 630 to perform the RACH procedure 632 that is contention-free in order to indicate a beam failure recovery request. Otherwise, the UE 604 may determine 630 to perform the RACH procedure 632 that is contention-based in order to indicate a beam failure recovery request.

In still another configuration, the UE 604 may determine 630 whether the beam failure recovery request is to be sent to the base station 602 using the contention-free RACH procedure with the dedicated preamble based on at least one candidate beam 608, which may be included in a list of candidate beams. The UE 604 may be configured via RRC signaling (e.g., in the beam failure recovery information 624) with contention-free RACH resources associated with one of the RSs 626 received through the candidate beam 608. When configured with such resources (e.g., dedicated resources associated with one of the RSs 626), and when a channel quality measurement (e.g., RSRP) measured for the one of the RSs 626 received through the candidate beam 608 satisfies an RS threshold (e.g., an RSRP threshold), then the UE 604 may determine 630 to perform the RACH procedure 632 that is contention-free in order to indicate a beam failure recovery request. Otherwise, the UE 604 may determine 630 to perform the RACH procedure 632 that is contention-based in order to indicate a beam failure recovery request.

Illustratively, the UE 604 may be allowed to perform a contention-free RACH procedure to convey a beam failure recovery request if the UE 604 has been assigned one or more dedicated PRACH resources associated with at least one of the RSs 626 (e.g., SS/PBCH blocks and/or CSI-RSs) and if a channel quality measurement (e.g., RSRP) of at least one of the corresponding RSs 626 (e.g., SS/PBCH blocks and/or CSI-RSs) satisfies (e.g., meets or exceeds) a configured threshold.

According to various aspects, the base station 602 may configure the UE 604 with one or more of the conditions for using the contention-free RACH procedure with the dedicated preamble to indicate the beam failure recovery request. Thus, the UE 604 may determine 630 whether to use the contention-free RACH procedure with the dedicated preamble based on information from the base station 602, which may configure the one or more conditions for using the contention-free RACH procedure to indicate the beam failure recovery request. The base station 602 may configure the UE 604 to send the beam failure recovery request using the contention-free or contention-based RACH procedure through at least one of an MIB, RMSI, DCI, MAC CE, RRC signaling, and/or handover command.

The base station 602 may determine whether UEs in the cell are permitted to indicate a beam failure recovery request using a contention-based RACH procedure with a dedicated preamble when timing unsynchronized with the base station. For example, the base station 602 may determine the base station 602 is able to support a contention-free RACH procedure with a dedicated preamble when a UE is timing unsynchronized in the cell, or the base station 602 may determine that all RACH procedures in the cell for timing-unsynchronized UEs are to be contention-based.

By way of illustration, the base station 602 may determine a number of UEs operating on the cell and/or estimated to be operating on the cell at a current time or future time, and the base station 602 may compare the number to a threshold number of UEs. When the number of UEs operating on the cell (or estimated to be operating on the cell) satisfies (e.g., meets or exceeds) the threshold number of UEs, then the base station 602 may determine that timing-unsynchronized UEs are unpermitted or prohibited from indicating a beam failure recovery request using a contention-free RACH procedure with a dedicated preamble. Thus, in the cell, all timing-unsynchronized UEs should use the contention-based RACH procedure to indicate a beam failure recovery request, which may reduce the probability of interference and/or collision. In one aspect, the threshold number of UEs may be based on the available number of cyclic shifts—e.g., whether the available number of cyclic shifts can accommodate the number of UEs.

The base station 602 may determine the beam failure recovery information 624 based on whether UEs are permitted to indicate a beam failure recovery request using a contention-free RACH procedure with the dedicated preamble when timing unsynchronized with the base station 602. For example, the base station 602 may configure the information 624 (e.g., including the second set of RACH parameters 620b) based on whether the UE 604 is permitted to indicate a beam failure recovery request using the contention-free RACH procedure with the dedicated preamble when timing unsynchronized with the base station 602.

For example, referring to the preceding configurations, when the timing-unsynchronized UE 604 is determined to be permitted to indicate a beam failure recovery request using the contention-free RACH procedure with the dedicated preamble, the base station 602 may configure a set of resources associated with transmission of the dedicated preamble of the contention-free RACH procedure to at least partially overlap with a set of resources for transmission of another preamble in a contention-based RACH procedure. In one such aspect, the base station 602 may configure a RACH occasion associated with the contention-free RACH procedure with the dedicated preamble to be the same as the RACH occasion for preamble transmission in a contention-based RACH procedure.

In another example, when the timing-unsynchronized UE 604 is determined to be permitted to indicate a beam failure recovery request using the contention-free RACH procedure with the dedicated preamble, the base station 602 may configure at least the ZCZC value in the second set of RACH parameters 620b to match the ZCZC value in the first set of RACH parameters 620a. In a further example, when the timing-unsynchronized UE 604 is determined to be permitted to indicate a beam failure recovery request using the contention-free RACH procedure with the dedicated preamble, the base station 602 may configure both the ZCZC value and the root sequence index in the second set of RACH parameters 620b to respectively match the ZCZC value and root sequence index in the first set of RACH parameters 620a.

In a further example, when the timing-unsynchronized UE 604 is determined to be permitted to indicate a beam failure recovery request using the contention-free RACH procedure with the dedicated preamble, the base station 602 may configure one or more dedicated PRACH resources to be assigned to the UE 604 for transmission of the dedicated preamble in the contention-free RACH procedure, and the base station 602 may configure the one or more dedicated PRACH resources to be associated with at least one of the RSs 626 (e.g., SS/PBCH blocks and/or CSI-RSs). Further to such an example, the base station 602 may configure a threshold associated with a channel quality measurement (e.g., an RSRP threshold) for the at least one of the corresponding RSs 626 (e.g., SS/PBCH blocks and/or CSI-RSs).

The UE 604 may perform the RACH procedure 632 to indicate a beam failure recovery request based on the determination 630 of whether to perform a contention-free RACH procedure with a dedicated preamble or a contention-based RACH procedure. For example, if the UE 604 determines not to perform the contention-free RACH procedure with the dedicated preamble to indicate a beam failure recovery request, the UE 604 may perform a contention-based RACH procedure, e.g., using the first set of RACH parameters 620a. Referring to FIG. 5A, the UE 604 may perform the contention-based RACH procedure 500, as described with respect to the UE 504.

If the UE 604 determines 630 to perform a contention-free RACH procedure with a dedicated preamble to indicate a beam failure recovery request, then the UE 604 may perform the contention-free RACH procedure with the dedicated preamble 634. For example, in the context of FIG. 5B, the UE 604 may perform the contention-free RACH procedure 540, as described with respect to the UE 504.

Referring again to FIG. 6, the UE 604 may generate the dedicated preamble 634 when the UE 604 determines 630 to perform the contention-free RACH procedure to indicate a beam failure recovery request. The UE 604 may determine (e.g., generate and/or select) the dedicated preamble 634 based on the information 624 (e.g., the second set of RACH parameters 620b, the preamble index, etc.).

In one aspect, the UE 604 may generate the dedicated preamble 634 based on a dedicated preamble index, a starting logical root sequence, and a ZCZC value. Illustratively, the base station 602 may send the second set of RACH parameters 620b indicating a dedicated preamble index of 9, a starting logical root sequence of 1, and a ZCZC value of 32 for a length 139 sequence. Therefore, the UE 604 may determine to use the first available cyclic shift of the third logical root sequence to generate the dedicated preamble (e.g., [139/32]=4, for numbering that may begin with 0). The UE 604 may use this dedicated preamble for a contention-free RACH procedure.

The UE 604 may perform the RACH procedure 632 that is contention-free by first sending the dedicated preamble 634 to the base station 602. As described with respect to the determination 630 of whether to perform the contention-free RACH procedure with the dedicated preamble, the UE 604 may send the dedicated preamble 634 to the base station 602 through the candidate beam 608, which may have been selected because the candidate beam 608 is associated with a dedicated preamble and one of the RSs 626 received on the candidate beam 608 satisfies (e.g., meets or exceeds) an RS threshold (e.g., an RSRP threshold).

Based on the dedicated preamble 634, the UE 604 may receive a random access response 636 from the base station 602. The random access response 636 may indicate at least one of a timing advance command (e.g., 11 or 12 bit timing advance command), a C-RNTI, and/or an uplink grant. The UE 604 may acquire timing synchronization with the base station 602 based on the random access response 636. In one aspect, the UE 604 may apply the timing advance to adjust the boundaries of at least one of symbols, slots, and/or subframes to be aligned (or aligned within a threshold amount) between the base station 602 and the UE 604. For example, the UE 604 may adjust the boundaries of at least one of uplink symbols, uplink slots, and/or uplink subframes to be aligned with a respective one of downlink symbols, downlink slots, and/or downlink subframes. The UE 604 may align at least one of the aforementioned boundaries to be within a timing offset, and the timing offset may be configured in the UE 604 by the base station 602. When the UE 604 is timing synchronized with the base station 602, the UE 604 may communicate with the base station 602 on a set of resources, which may be scheduled by the base station 602.

Figure 7:
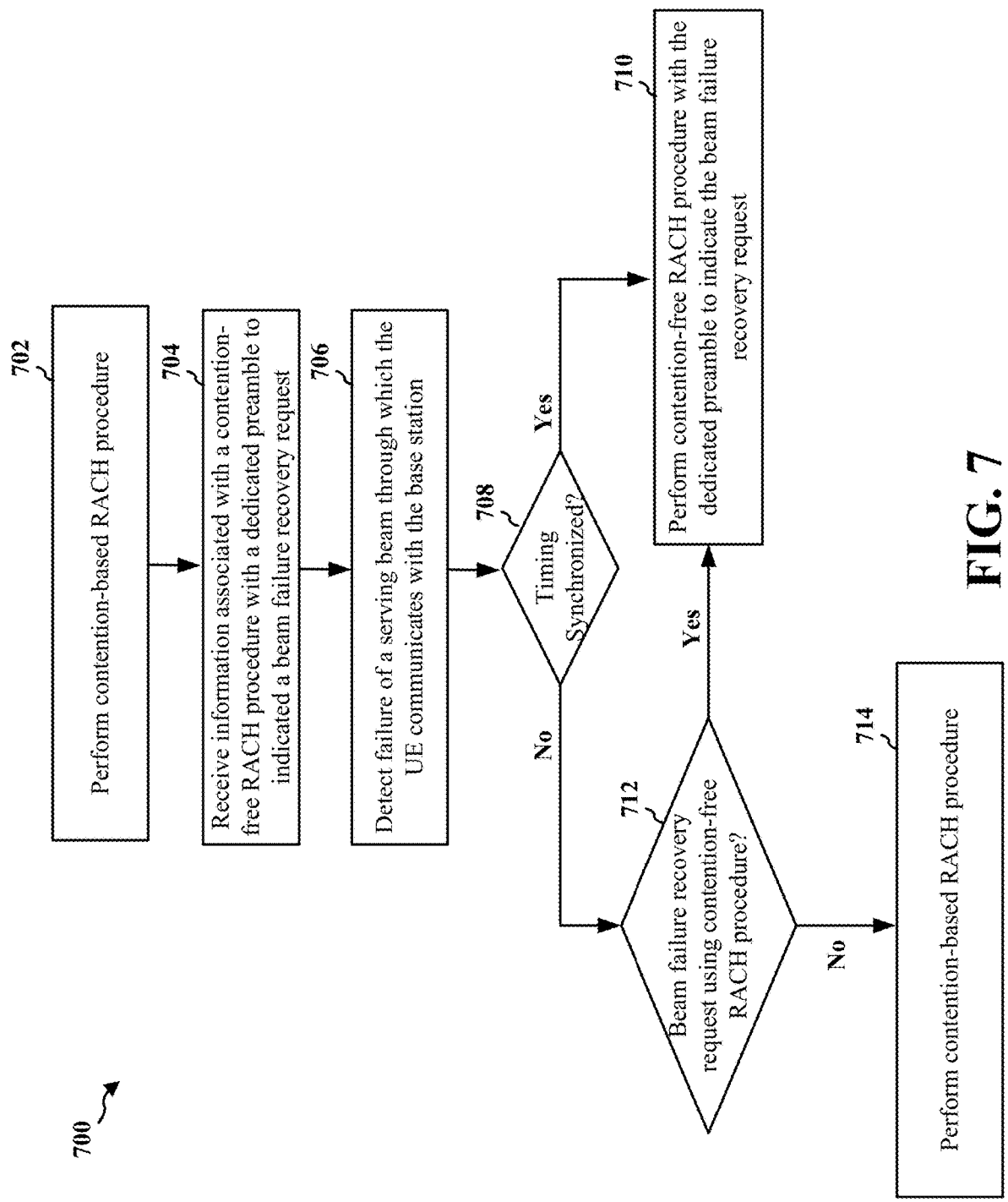
FIG. 7 is a flow chart of a method of wireless communication for a UE.

FIG. 7 illustrates a method 700 of wireless communication by a UE. For example, the method 700 may be practiced in at least one of the UE 104, the UE 404, the UE 504, and/or the UE 604. In another example, the method 700 may be practiced in the apparatus 902/902'. According to various aspects, one or more of the illustrated operations of the method 700 may be omitted, transposed, and/or contemporaneously performed.

At operation 702, the UE may perform a contention-based RACH procedure with a base station. For example, the UE may generate a RACH preamble based on a set of RACH resources received from a base station. The UE may receive a random access response from the base station based on the RACH preamble. In response to the random access response, the UE may generate a MSG3, and may transmit the MSG3 to the base station. Based on the MSG3, the UE may receive a MSG4 (e.g., a contention resolution message) from the base station. From the contention-based RACH procedure, the UE may acquire timing synchronization with the base station, e.g., for uplink communication with the base station.

In the context of FIG. 5A, the UE 504 may perform the contention-based RACH procedure with the base station 502 (e.g., during initial access or handover), as illustrated by the contention-based RACH procedure 500. In the context of FIG. 6, the UE 604 may perform the contention-based RACH procedure 622 with the base station 602, e.g., using the first set of RACH parameters 620a.

At operation 704, the UE may receive, from the base station, information associated with a dedicated preamble to be used for a contention-free RACH procedure. In one aspect, the UE may receive the information associated with the dedicated preamble through RRC signaling. In one aspect, the UE may receive information associated with a dedicated preamble that indicates a preamble index, a starting logical root sequence, and/or a ZCZC value. In the context of FIG. 6, the UE 604 may receive the beam failure recovery information 624 from the base station 602. The information 624 may include the second set of RACH parameters 620b.

At operation 706, the UE may detect failure of a serving beam through which the UE communicates with the base station. For example, the UE may measure or estimate a BLER associated with a serving beam. In an aspect, the BLER may be associated with one or more TBs received by the UE. The UE may measure or estimate the BLER by measuring an SINR associated with the serving beam and/or by calculating a number of TBs that fail CRC validation. In one aspect, the UE may compare the BLER to a first threshold, and detect the failure of the serving beam based on the comparison of the BLER to the first threshold. In another aspect, the UE may compare the SINR to a second threshold, and detect the failure of the serving beam based on the comparison of the SINR to the second threshold. In another aspect, the UE may compare the number of TBs that fail CRC validation to a third threshold, and detect the failure of the serving beam based on the comparison of the number of TBs that fail CRC validation to the third threshold. In the context of FIG. 6, the UE 604 may detect a failure 628 of the serving beam 606.

At operation 708, the UE may determine whether the UE is timing synchronized with the base station. For example, the UE may determine whether boundaries of at least one of symbols, slots, and/or subframes are unaligned between the UE and the base station, e.g., for uplink communication and downlink communication, respectively. The UE may be timing synchronized with the base station when at least one of symbols, slots, and/or subframes are aligned between the UE and the base station, e.g., within a threshold margin. The UE may be timing unsynchronized with the base station when at least one of symbols, slots, and/or subframes are unaligned between the UE and the base station, e.g., by more than the threshold margin. In the context of FIG. 6, the UE 604 may determine whether the UE 604 is timing unsynchronized with the base station 602.

In one aspect, the UE may determine whether a most recently received downlink signal has arrived at a different time location when compared to one or more previous received downlink signals. For example, the UE may expect a downlink signal to be received at a symbol boundary 2 (e.g., the base station has scheduled downlink data in symbol boundary 2). However, the UE may detect that the most recently received downlink signal has been received with a 1 s offset from symbol boundary 2. The UE may determine whether a contention-free RACH procedure can accommodate this 1 s asynchronous timing offset (e.g., whether the cyclic shifts of a same root sequence for contention-free RACH procedure are spaced apart by 1 as). If the contention-free RACH procedure cannot accommodate the 1 s asynchronous timing (e.g., the cyclic shifts are closer than 1 as), then UE may determine that the UE is timing unsynchronized with the base station.

In another aspect, the UE may receive, from the base station, an uplink timing advance command (e.g., via MAC CE or MSG2). If the UE has received a timing advance command but has been unable to apply the timing advance command, then the UE may determine that the UE is timing unsynchronized with the base station. In another aspect, the UE may determine that the UE is timing unsynchronized with the base station based on a timer (e.g., timeAlignmentTimer). For example, the UE may determine that the timer has expired, and the UE may determine that a timing advance command is unreceived during the duration of the timer. In another aspect, the UE may determine that the UE is timing unsynchronized with the base station when the timer is not configured.

If the UE determines that the UE is timing synchronized with the base station, then the method 700 may proceed to operation 710. At operation 710, the UE may send a beam failure recovery request to the base station using a contention-free RACH procedure with a dedicated preamble. For example, the UE may determine (e.g., generate or select) a RACH preamble, e.g., based on a set of contention-free RACH parameters received from the base station via RRC signaling. The UE may send the RACH preamble to the base station and, in response to the RACH preamble, the UE may receive a random access response from the base station. The random access response may include a timing advance command, which the UE may apply to become timing synchronized with the base station.

In the context of FIG. 5B, the UE 504 may perform the contention-free RACH procedure 540 with the base station 502. In the context of FIG. 6, the UE 604 may perform the RACH procedure 632, which may be contention free, by sending the dedicated preamble 634 to the base station 602 and receiving the random access response 636.

If the UE determines that the UE is timing unsynchronized with the base station, then the method 700 may proceed to operation 712. At operation 712, the UE may determine whether to perform a contention-free RACH procedure with a dedicated preamble to indicate a beam failure recovery request. In the context of FIG. 6, the UE 604 may determine 630 whether to send a beam failure recovery request to the base station 602 using a contention-free RACH procedure with a dedicated preamble. In one aspect, the UE 604 may determine 630 whether the beam failure recovery request is to be sent to the base station 602 using the contention-free RACH procedure with the dedicated preamble by determining whether a first set of resources allocated to the UE 604 in association with the dedicated preamble at least partially overlaps with a second set of resources allocated by the base station 602 for the contention-based RACH procedure. If the first set of resources at least partially overlaps with the second set of resources, the UE 604 may determine 630 to send the beam failure recovery request to the base station 602 using the contention-free RACH procedure with the dedicated preamble. Otherwise, the UE 604 may determine 630 to send the beam failure recovery request to the base station 602 using the contention-based RACH procedure.

In one aspect, the UE 604 may determine 630 whether the beam failure recovery request is to be sent to the base station 602 using the contention-free RACH procedure with the dedicated preamble by determining whether a first ZCZC value associated with the dedicated preamble is equal to a second ZCZC value associated with the contention-based RACH procedure. The first ZCZC value may be signaled to the UE 604 in the second set of RACH parameters 620b (e.g., for beam failure recovery) and the second ZCZC value may be signaled to the UE 604 in the first set of RACH parameters 620a (e.g., for initial-access, handover, cell selection, etc.). If the first ZCZC value matches the second ZCZC value, then the UE 604 may determine 630 to send the beam failure recovery request to the base station 602 using the contention-free RACH procedure with the dedicated preamble. Otherwise, the UE 604 may determine 630 to send the beam failure recovery request to the base station 602 using the contention-based RACH procedure.

In one aspect, in addition to the first ZCZC value matching the second ZCZC value, the UE 604 may determine whether a first root sequence index associated with the dedicated preamble is associated with a second root sequence index associated with the contention-based RACH procedure. The first root sequence index may be signaled to the UE 604 in the second set of RACH parameters 620b (e.g., for beam failure recovery) and the second root sequence index may be signaled to the UE 604 in the first set of RACH parameters 620a (e.g., for initial-access, handover, cell selection, etc.). If the first root sequence index matches the second root sequence index (and the first ZCZC value matches the second ZCZC value), then the UE 604 may determine 630 to send the beam failure recovery request to the base station 602 using the contention-free RACH procedure with the dedicated preamble. Otherwise, the UE 604 may determine 630 to send the beam failure recovery request to the base station 602 using the contention-based RACH procedure.

In one aspect, the base station 602 may configure the UE 604 to use the contention-free RACH procedure or the contention-based RACH procedure. Therefore, the UE 604 may determine 630 whether the beam failure recovery request is to be sent to the base station 602 using the contention-free RACH procedure with the dedicated preamble based on information (e.g., the information 624) received from the base station 602. For example, the base station 602 may configure the UE 604 to send a beam failure recovery request using the contention-based RACH procedure if the UE 604 is timing unsynchronized with the base station 602. In another example, the base station 602 may configure the UE 604 to send the beam failure recovery request using the contention-based RACH procedure when the UE 604 is timing unsynchronized with the base station 602 and the dedicated preamble 634 is not associated with a RACH occasion that is the same as the RACH occasion for contention-based RACH preamble transmission in a cell provided by the base station 602. In another example, the base station 602 may configure the UE 604 to send the beam failure recovery request using the contention-based RACH procedure when the root sequence index and/or ZCZC value in the second set of RACH parameters 620*b* (e.g., for beam failure recovery) does not match the root sequence index and/or ZCZC value in the first set of RACH parameters 620*a* (e.g., for initial access, handover, cell selection, etc.). In aspects, the base station 602 may configure the UE 604 to send the beam failure recovery request using the contention-free or contention-based RACH procedure through at least one of an MIB, RMSI, DCI, MAC CE, RRC signaling, and/or handover command.

In one aspect of operation 712, the UE may determine whether a first set of resources, associated with a contention-free RACH procedure to convey a beam failure recovery request, is associated with any RSs (e.g., SS/PBCH blocks and/or CSI-RSs) that have been explicitly provided by RRC signaling to the UE. Additionally or alternatively, the UE may determine if the first set of resources provided to the UE for a contention-free RACH procedure for a beam failure recovery request are on the same RACH occasion that is associated with another set of resources for a contention-based RACH procedure. If the UE determines that first set of resources are associated with any RSs that have been explicitly provided by RRC signaling to the UE and/or if the first set of resources are on the same RACH occasion as the contention-based set of RACH resources, then the UE may determine to perform a contention-free RACH procedure with a dedicated preamble to indicate a beam failure recovery request. Other aspects may be provided, supra.

If the UE determines to send the beam failure recovery request to the base station using the contention-free RACH procedure with the dedicated preamble, the method 700 may proceed to operation 710. At operation 710, the UE may send a beam failure recovery request to the base station using a contention-free RACH procedure with a dedicated preamble. In the context of FIG. 6, if the UE 604 determines to send a beam failure recovery request using the contention-free RACH procedure with a dedicated preamble, then the UE 604 may select a candidate beam 608 for communication with the base station and the UE 604 may send the dedicated preamble to the base station 602 through the selected candidate beam 608. In one aspect, the dedicated preamble is frequency-division multiplexed in one or more resources associated with the contention-based RACH procedure (e.g., RACH opportunity). In one aspect, the dedicated preamble is code-division multiplex with a plurality of other preambles associated with the contention-based RACH procedure (e.g., the root sequence indexes and/or ZCZC values may be the same for the dedicated preamble and the contention-based RACH procedure).

If the UE determines to send a beam failure recovery request using a contention-based RACH procedure, the method 700 may proceed to operation 714. At operation 714, the UE may send a beam failure recovery request to the base station using a contention-based RACH procedure. For example, the UE may determine (e.g., generate or select) a RACH preamble, e.g., based on a set of contention-free RACH parameters received from the base station via RRC signaling. The UE may send the RACH preamble to the base station and, in response to the RACH preamble, the UE may receive a random access response from the base station. The random access response may include a timing advance command, which the UE may apply to become timing synchronized with the base station. For example, the UE may adjust boundaries of at least one of uplink symbols, uplink slots, and/or uplink subframes to be aligned with (e.g., within a timing offset) a respective one of downlink symbols, downlink slots, and/or downlink subframes. The timing offset may be configured by the base station, e.g., via RRC signaling.

In the context of FIG. 5B, the UE 504 may perform the contention-free RACH procedure 540 with the base station 502. In the context of FIG. 6, the UE 604 may perform the RACH procedure 632, which may be contention free, by sending the dedicated preamble 634 to the base station 602 and receiving the random access response 636.

Figure 8:
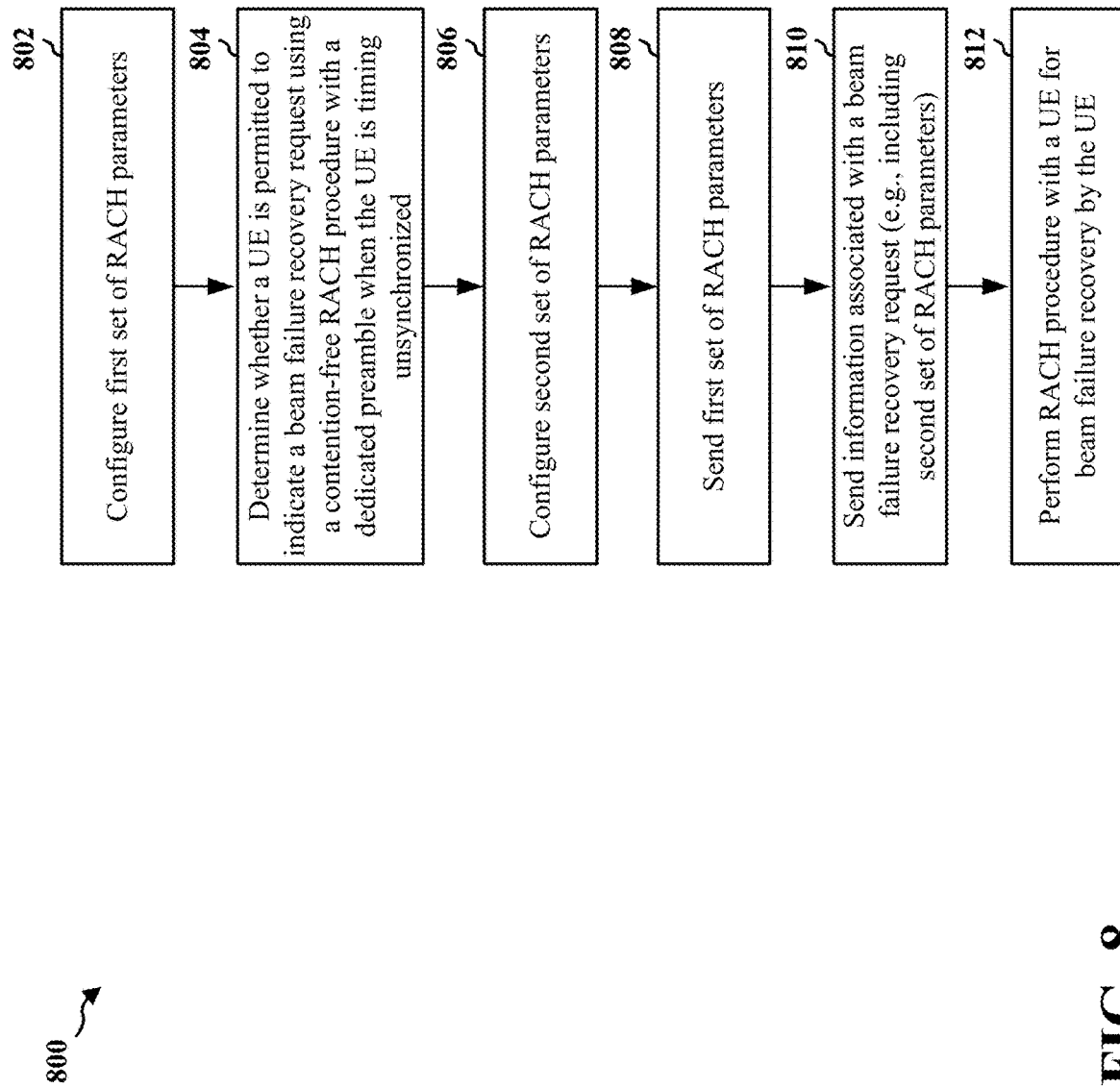
FIG. 8 is a flow chart of a method of wireless communication by a base station.

FIG. 8 illustrates a method 800 of wireless communication by a base station. For example, the method 800 may be practiced in at least one of the base station 102/180, the base station 402, the base station 502, and/or the base station 602. In another example, the method 800 may be practiced in the apparatus 1102/1102'. According to various aspects, one or more of the illustrated operations of the method 700 may be omitted, transposed, and/or contemporaneously performed.

At operation 802, the base station may configure a first set of RACH parameters. The base station may configure the first set of RACH parameters for a contention-based RACH procedure in a cell provided the base station. For example, the base station may determine a first number of cyclic shifts $N_{CS}$. The base station may further determine a first starting root sequence configuration. The base station may further determine a first maximum number of preambles in the cell. In addition, the base station may allocate a first set of resources for a contention-based RACH procedure. For example, the base station may allocate at least one first RACH region and/or the base station may schedule at least one first RACH occasion.

In the context of FIGS. 5A and 5B, the base station 502 may configure a first set of RACH parameters. The first set of RACH parameters may be associated with the contention-based RACH procedure 500. In the context of FIG. 6, the base station 602 may configure the first set of RACH parameters 620*a*. The first set of RACH parameters may be associated with a contention-based RACH procedure in a cell provided by the base station 602 (e.g., the contention-based RACH procedure 622).

At operation 804, the base station may determine whether a UE is permitted to indicate a beam failure recovery request using a contention-based RACH procedure with a dedicated preamble when the UE is timing unsynchronized with the base station. For example, the base station may determine the base station is able to support a contention-free RACH procedure that all RACH procedures in the cell for timing unsynchronized UEs are to be contention-based. By way of illustration, the base station may determine a number of UEs operating on the cell and/or estimated to be operating on the cell at a current time or future time, and the base station may compare the number to a threshold. When the number of UEs operating on the cell (or estimated to be operating on the cell) satisfies the threshold, then the base station may determine that all timing-unsynchronized UEs should use the contention-based RACH procedure to indicate a beam failure recovery request, which may reduce the probability of interference and/or collision. In one aspect, the threshold number of UEs may be based on the available number of cyclic shifts—e.g., whether the available number of cyclic shifts can accommodate the number of UEs. In the context of FIG. 6, the base station 602 may determine whether a beam failure recovery request may be indicated in a contention-free RACH procedure for UEs that are timing unsynchronized in the cell.

At operation 806, the base station may configure a second set of RACH parameters. The base station may configure the second set of RACH parameters for a contention-free RACH procedure with a dedicated preamble to indicate a beam failure recovery request. For example, the base station may determine a second number of cyclic shifts $N_{CS}$. The base station may further determine a second starting root sequence configuration. The base station may further determine a second maximum number of preambles in the cell.

In some aspects, the base station may configure a preamble index associated with a beam failure recovery request in the cell. In addition, the base station may allocate a first set of resources for a contention-free RACH procedure to indicate a beam failure recovery request in the cell. For example, the base station may allocate at least one second RACH region and/or the base station may schedule at least one second RACH occasion. Further, the base station may configure one or more dedicated PRACH resources to be associated with at least one RS (e.g., SS/PBCH block and/or CSI-RS), which may be explicitly indicated to a UE via RRC signaling. In connection with the at least one RS, the base station may configure at least one channel quality threshold (e.g., RSRP threshold) corresponding to the at least one RS associated with the dedicated PRACH resources. The at least one RS may correspond to a beam via which the at least one RS is communicated, e.g., SS/PBCH block ID and/or CSI-RS ID may correspond to a candidate beam via which the SS/PBCH block and/or CSI-RS is communicated.

In one aspect, the base station may configure the second set of RACH parameters for a contention-free RACH procedure with a dedicated preamble (operation 806) based on whether the base station determines a beam failure recovery request may be indicated by a contention-free RACH procedure with a dedicated preamble (operation 804). When the base station determines that a beam failure recovery request may be indicated by a contention-free RACH procedure with a dedicated preamble, the base station may configure the second set of RACH parameters to include at least a subset of parameters that is the same as the first set of RACH parameters configured for a contention-based RACH procedures.

For example, the base station may configure at least the second number of cyclic shifts $N_{CS}$ to be the same as the first number of cyclic shifts $N_{CS}$ and, potentially, the second starting root sequence configuration to be the same as the first starting root sequence configuration. In another example, when the base station determines that a beam failure recovery request may be indicated by a contention-free RACH procedure with a dedicated preamble, the base station may allocate the second set of resources to be the same as the first set of resources, e.g., such that the first and second RACH region(s) and/or the first and second RACH occasions are the same. In some aspects, the first set of resources configured for a contention-based RACH procedure may be frequency-division multiplex with the second set of resources configured for a contention-free RACH procedure with a dedicated preamble. Additionally or alternatively, contention-based RACH preambles may be code-division multiplexed with contention-free RACH preambles, e.g., when timing-unsynchronized UEs are allowed to perform a contention-free RACH procedure with a dedicated preamble to indicate a beam failure recovery request.

At operation 808, the base station may send the first set of RACH parameters. The base station may send the first set of RACH parameters via broadcast, such as by including the first set of RACH parameters in at least one SIB that may be broadcast in the cell provided by the base station. In various aspects, one or more of the first set of RACH parameters may be implicitly signaled—e.g., the available number of cyclic shifts $N_{CS}$ may be indicated through a ZCZC value and/or one or more of the other first set of RACH parameters may be indicated through an index (e.g., a configuration index).

In the context of FIGS. 5A and 5B, the base station 502 may send a first set of RACH parameters, e.g., for the contention-based RACH procedure 500 in a cell provided by the base station 502. The base station 502 may send the first set of RACH parameters in a SIB, received by the UE 504, and the UE 504 may generate the MSG1 510 based on the first set of RACH parameters. In the context of FIG. 6, the base station 602 may send the first set of RACH parameters 620a in the cell provided by the base station 602. The base station 602 may send the first set of RACH parameters 620a in a SIB, received by the UE 604, and the UE 604 may perform the contention-based RACH procedure 622 based on the first set of RACH parameters 620a.

At operation 810, the base station may send information associated with a beam failure recovery request to a UE operating on the cell provided by the base station. The information associated with the beam failure recovery request may include the second set of RACH parameters (configured according to operation 806). The base station 602 may signal the information associated with the beam failure recovery request to the UE in one or more RRC messages.

In the context of FIGS. 5A and 5B, the base station 502 may send a second set of RACH parameters, including at least the random access preamble assignment 542, to the UE 504, e.g., for the contention-free RACH procedure 540 to indicate a beam failure recovery request in a cell provided by the base station 502. The base station 502 may signal the second set of RACH parameters, including at least the random access preamble assignment 542, in one or more RRC messages, received by the UE 504, and the UE 504 may generate the random access preamble 544 based on the second set of RACH parameters. In the context of FIG. 6, the base station 602 may send the information 624 associated with a beam failure recovery request in a cell provided by the base station 602, and the information 624 may include the second set of RACH parameters 620b. The base station 602 may signal the information 624 in one or more RRC messages, and the UE 604 may perform the RACH procedure 632 based on the information 624 (e.g., including the second set of RACH parameters 620b) to convey a request to recover from the beam failure 628.

According to various aspects, the information associated with the beam failure recovery request may include a power for transmission of a dedicated preamble, a set of RACH occasions for transmission of a dedicated preamble, a maximum number of RACH preamble transmissions, a power-ramping factor, a frequency offset associated with frequency-division multiplexing with one or more other RACH resources, and/or one or more masks for RACH resources and/or RSs (e.g., SS/PBCH blocks). Further, the information associated with the beam failure recovery request may indicate at least one threshold (e.g., an RSRP threshold) for selection of a candidate beam on which an RS is received, a list of RSs corresponding to candidate beams associated with beam failure recovery, one or more RACH resources associated with one or more beams, and/or at least one dedicated preamble associated with at least one beam for beam failure recovery.

At operation 812, the base station may perform a RACH procedure with the UE for beam failure recovery by the UE. The RACH procedure may be contention-based or contention-free with a dedicated preamble. If the UE is timing synchronized with the base station, the RACH procedure may be contention-free with a dedicated preamble. If the UE is timing unsynchronized and the base station has determined that UEs in the cell are not allowed to convey beam failure recovery requests using a contention-free RACH procedure (as described at operation 804, supra), then the RACH procedure may be contention-based. However, if the base station has determined that timing unsynchronized UEs may convey beam failure recovery requests using a contention-free RACH procedure with a dedicated preamble, then the RACH procedure may be contention-free with a dedicated preamble when the UE is timing unsynchronized with the base station.

To perform the contention-based RACH procedure, the base station may receive a MSG1, which may include a RACH preamble generated by the UE based on the first set of RACH parameters. The base station may determine at least a timing advance command for the UE, e.g., based on the RACH preamble. The base station may send a MSG2 (e.g., random access response) to the UE based on the MSG1. The base station may receive a MSG3 from the UE, including information on a PUSCH, based on the MSG2. The base station may then send a MSG4 to the UE in response to the MSG3, and the MSG4 may include a contention resolution message. From the contention-based RACH procedure, the base station may determine the UE is timing synchronized with the base station.

To perform the contention-free RACH procedure with the dedicated preamble, the base station may first receive the dedicated preamble, which may be determined by the UE based on the information associated with a beam failure recovery request in the cell. The base station may determine a timing advance command for the UE, e.g., based on the dedicated preamble. The base station may send a random access response to the UE in response to the dedicated preamble, and the random access response may include the timing advance command. From the contention-free RACH procedure with the dedicated preamble, the base station may determine the UE is timing synchronized with the base station.

In the context of FIGS. 5A and 5B, the base station 502 may perform, with the UE 504, the contention-based RACH procedure 500 or the contention-free RACH procedure 540. In the context of FIG. 6, the base station 602 may perform the RACH procedure 632, which may be contention free, by receiving the dedicated preamble 634 from the UE 604 and sending the random access response 636 to the UE 604 based on the dedicated preamble 634.

Figure 9:
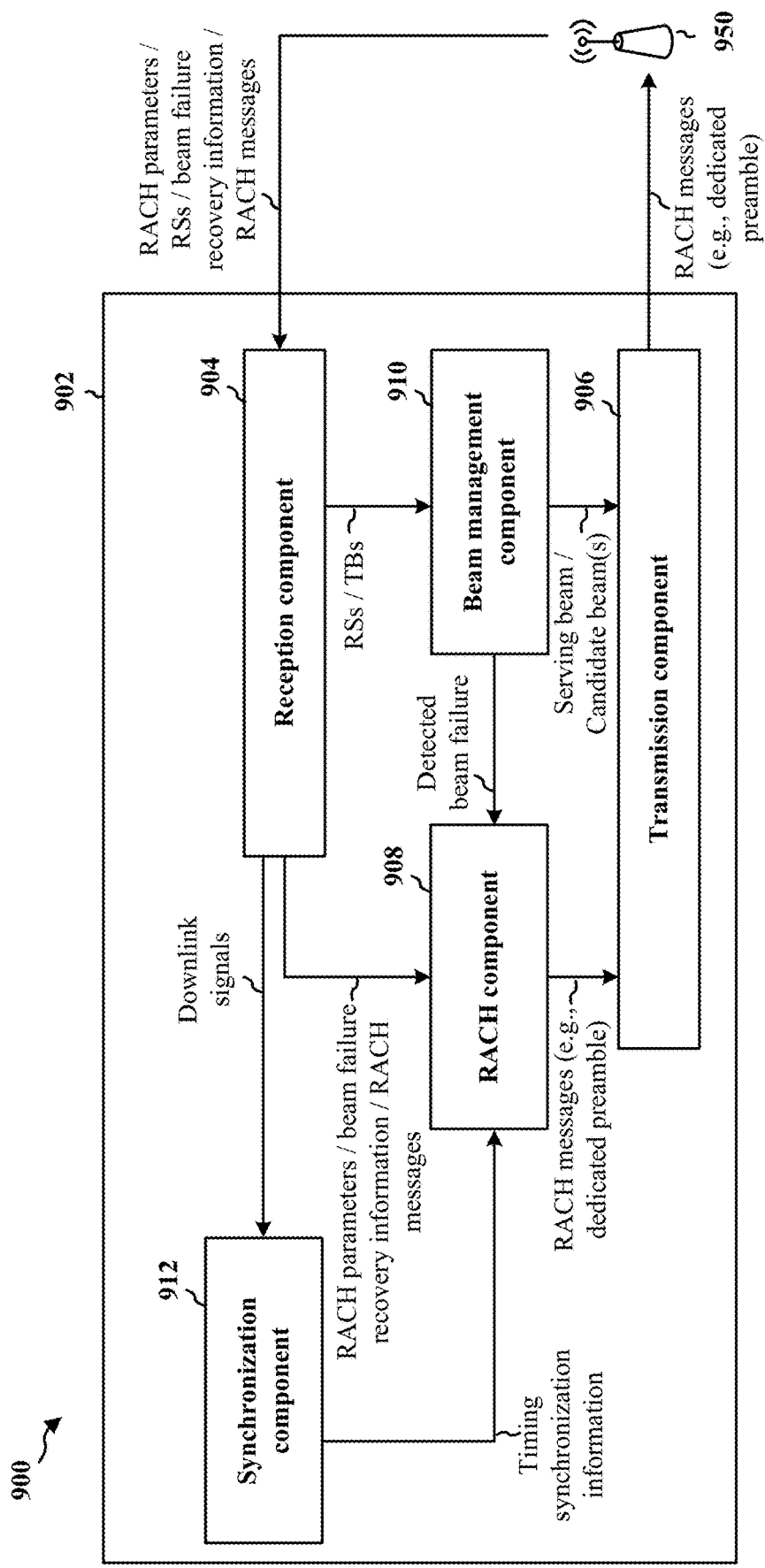
FIG. 9 is a conceptual data flow diagram illustrating the data flow between different means/components in an example apparatus.

FIG. 9 is a conceptual data flow diagram 900 illustrating the data flow between different means/components in an apparatus 902, in accordance with one or more aspects of the present disclosure. The apparatus 902 may be a UE. For example, referring to FIGS. 1-6, the apparatus 902 may be embodied in the UE 104, the UE 350, the UE 404, the UE 504, and/or the UE 604. The apparatus 902 may include a reception component 904 configured to receive signals (e.g., downlink signals) from a base station 950. The apparatus 902 may include a transmission component 906 configured to transmit signals (e.g., uplink signals) to the base station 950.

The reception component 904 may receive, inter alia, a first set of RACH parameters from the base station 950. The first set of RACH parameters may be included in at least one SIB. The first set of RACH parameters may include information associated with a contention-based RACH procedure. In some aspects, the first set of RACH parameters may indicate a first ZCZC value and a first root sequence index associated with a preamble for the contention-based RACH procedure. In some aspects, the first set of RACH parameters may indicate a first set of resources associated with transmission of the preamble for the contention-based RACH procedure. For example, the first set of RACH parameters may indicate a RACH region and/or RACH occasion associated with the transmission of the preamble for the contention-based RACH procedure.

The reception component 904 may provide the first set of RACH parameters to a RACH component 908. The RACH component 908 may be configured to perform one or more RACH procedures with the base station 950. The one or more RACH procedures may be contention-based and/or contention-free. In an aspect, at least one contention-free RACH procedure may include a dedicated preamble, and may be associated with a beam failure recovery request.

The RACH component 908 may first perform a contention-based RACH procedure with the base station 950, e.g., for initial access and/or handover in a cell provided by the base station 950. The contention-based RACH procedure may be based on the first set of RACH parameters. Accordingly, the RACH component 908 may generate a contention-based RACH preamble based on the first set of parameters, and may cause the transmission component 906 to transmit the contention-based RACH preamble (e.g., in a MSG1) to the base station 950. Based on the contention-based RACH preamble, the reception component 904 may receive a random access response (e.g., in a MSG2) from the base station 950. The RACH component 908 may further cause the transmission component 906 to transmit an RRC connection request message (e.g., MSG3) to the base station 950 based on the random access response. To complete the contention-based RACH procedure, the RACH component 908 may receive a contention resolution message (e.g., MSG4) from the base station 950 based on the RRC connection request message.

The RACH component 908 may provide the timing advance from the random access response to a synchronization component 912. The synchronization component 912 may be configured to timing synchronize the apparatus 902 with the base station 950. For example, the synchronization component 912 may apply a timing advance included in the random access response, which may adjust timing of uplink signals by the transmission component 906. For example, the synchronization component 912 may cause boundaries of at least one of uplink symbols, slots, and/or subframes to be aligned with boundaries of a corresponding at least one of downlink symbols, slots, and/or subframes. The uplink boundaries and downlink boundaries may be aligned within a timing offset threshold, and the timing offset threshold may be configured by the base station 950 (e.g., received in a SIB or RRC message).

In some aspects, the synchronization component 912 may maintain an alignment timer, the duration of which may be configured by the base station 950 (e.g., received in a SIB or RRC message) and may be specific to the apparatus 902 (e.g., UE-specific) or cell-specific. The synchronization component 912 may begin the alignment timer when the timing advance is applied. The synchronization component 912 may periodically receive, through the reception component 904 from the base station 950, one or more timing advance commands. The synchronization component 912 may apply each timing advance command, e.g., to adjust timing of uplink signals by the transmission component 906. The synchronization component 912 may restart the alignment timer when each timing advance command is received.

The synchronization component 912 may determine whether the apparatus 902 is timing synchronized with the base station 950—e.g., whether boundaries of uplink signals by the transmission component 906 are aligned within a threshold margin with boundaries of downlink signals received by the reception component 904. For example, the apparatus 902 may be timing unsynchronized with the base station 950 when boundaries of at least one of symbols, slots, and/or subframes are unaligned between the apparatus 902 and the base station 950 (e.g., when uplink boundaries are unaligned with downlink boundaries). In another example, the apparatus 902 may be timing unsynchronized with the base station 950 when a timing offset between the apparatus 902 and the base station 950 satisfies a timing offset threshold, which may be configured by the base station 950. In another example, the apparatus 902 may be timing unsynchronized with the base station 950 when a timing advance command is not received before expiration of the alignment timer. The synchronization component 912 may indicate, to the RACH component 908, whether the apparatus 902 is timing synchronized or timing unsynchronized with the base station 950.

The reception component 904 may further receive one or more RSs through one or more beams, and provide the received RSs to a beam management component 910. The beam management component 910 may measure respective RS strengths or qualities (e.g., RSRPs) based on each received RS. The beam management component 910 may select a serving beam through which the apparatus 902 (e.g., the transmission component 906) may transmit uplink signals to the base station 950, e.g., based on the RS measurements.

The beam management component 910 may further determine a list of candidate beams, which may include one or more candidate beams that are different from the serving beam. The list of candidate beams may include one or more beams having the "best" or highest RS measurements (e.g., one or more beams with the highest RSRPs). The beam management component 910 may maintain the list of candidate beams.

The reception component 904 may further receive information associated with beam failure recovery by the apparatus 902. The beam failure recovery information may be signaled from the base station 950 in one or more RRC messages. The beam failure recovery information may include information associated with transmission of a beam failure recovery request by the transmission component 906. For example, the information may include whether the apparatus 902 permitted to use a contention-free RACH procedure with a dedicated preamble when the apparatus 902 is timing unsynchronized with the base station 950.

The beam failure recovery information may include a second set of RACH parameters associated with the contention-free RACH procedure with the dedicated preamble. In some aspects, the beam failure recovery information may include a preamble index for the dedicated preamble. In some aspects, the beam failure recovery information may indicate a second ZCZC value and a second root sequence index associated with the dedicated preamble. In some aspects, the beam failure recovery information may indicate a second set of resources associated with transmission of the dedicated preamble for the contention-free RACH procedure to indicate the beam failure recovery request. For example, the beam failure recovery information may indicate a RACH region and/or RACH occasion associated with the transmission of the dedicated preamble for the contention-free RACH procedure to indicate the beam failure recovery request.

In some aspects, the beam failure recovery information may configure one or more dedicated PRACH resources to be associated with at least one RS (e.g., SS/PBCH block and/or CSI-RS), which may be explicitly indicated via RRC signaling. In connection with the at least one RS, the beam failure recovery information may configure at least one channel quality threshold (e.g., RSRP threshold) corresponding to the at least one RS associated with the dedicated PRACH resources. The at least one RS may correspond to a beam via which the at least one RS is communicated, e.g., a SS/PBCH block ID and/or CSI-RS ID may correspond to a candidate beam via which the SS/PBCH block and/or CSI-RS is communicated.

The beam management component 910 may receive downlink signals through the reception component 904. In one aspect, the beam management component 910 may measure a SINR based on the downlink signals. In another aspect, the beam management component 910 may determine a number of unsuccessfully decoded TBs of the downlink signals, such as by determining a number of TBs that fail CRC validation and are therefore unsuccessfully decoded. The beam management component 910 may determine a BLER based on the SINR and/or based on the unsuccessfully decoded TBs. If the BLER is determined to be relatively high, then the beam management component 910 may detect a failure of the serving beam.

The beam management component 910 may indicate the detection of the failure of the serving beam to the RACH component 908. The RACH component 908 may be configured to perform a RACH procedure to convey a beam failure recovery request to the base station 950. If the apparatus 902 is timing synchronized with the base station 950, the RACH component 908 may perform a contention-free RACH procedure with the dedicated preamble to indicate the beam failure recovery request to the base station 950.

However, if the apparatus 902 is timing unsynchronized with the base station 950, the RACH component 908 may determine whether to indicate the beam failure recovery request to the base station 950 using the contention-free RACH procedure with the dedicated preamble. The RACH component 908 may determine whether to indicate the beam failure recovery request to the base station 950 using the contention-free RACH procedure with the dedicated preamble based on the beam failure recovery information received from the base station 950, such as based on the second set of RACH parameters and/or other information associated with beam failure recovery.

In one aspect, the RACH component 908 may determine whether to indicate the beam failure recovery request to the base station 950 using the contention-free RACH procedure with the dedicated preamble by determining whether the first set of resources allocated in association with the contention-based RACH procedure (e.g., indicated in the first set of RACH parameters) at least partially overlaps with the second set of resources allocated in association with the dedicated preamble (e.g., indicated in the beam failure recovery information, such as in the second set of RACH parameters). The first set of resources and the second set of resources may be associated with a RACH occasion and/or a RACH region. When the RACH component 908 determines the first set of resources at least partially overlaps with the second set of resources, the RACH component 908 may determine that the RACH component 908 is to indicate the beam failure recovery request to the base station 950 using the contention-free RACH procedure with the dedicated preamble. Otherwise, the RACH component 908 may determine that the RACH component 908 is to indicate the beam failure recovery request to the base station 950 using the contention-based RACH.

The first set of resources and the second set of resources may be associated with a RACH occasion and/or a RACH region. Therefore, the RACH component 908 may determine that the RACH component 908 is to indicate the beam failure recovery request to the base station 950 using the contention-free RACH procedure with the dedicated preamble when a RACH occasion associated with the contention-free RACH procedure with the dedicated preamble at least partially overlaps with a RACH occasion associated with the contention-based RACH procedure. Alternatively or additionally, the RACH component 908 may determine that the RACH component 908 is to indicate the beam failure recovery request to the base station 950 using the contention-free RACH procedure with the dedicated preamble when a RACH region (e.g., RACH subcarrier region) associated with the contention-free RACH procedure with the dedicated preamble at least partially overlaps with a RACH region associated with the contention-based RACH procedure.

In another aspect, the RACH component 908 may determine whether to indicate the beam failure recovery request to the base station 950 using the contention-free RACH procedure with the dedicated preamble by determining whether at least the first ZCZC value associated with the contention-based RACH procedure (e.g., indicated in the first set of RACH parameters) matches (e.g., is equal to) the second ZCZC value associated with the dedicated preamble of the contention-free RACH procedure (e.g., indicated in the beam failure recovery information, such as in the second set of RACH parameters). When the RACH component 908 determines the first ZCZC value associated with the contention-based RACH procedure matches (e.g., is equal to) the second ZCZC value associated with the dedicated preamble, the RACH component 908 may determine that the RACH component 908 is to indicate the beam failure recovery request to the base station 950 using the contention-free RACH procedure with the dedicated preamble. Otherwise, the RACH component 908 may determine that the RACH component 908 is to indicate the beam failure recovery request to the base station 950 using the contention-based RACH procedure.

Further to such an aspect, the RACH component 908 may determine whether to indicate the beam failure recovery request to the base station 950 using the contention-free RACH procedure with the dedicated preamble by further determining whether the first root sequence index associated with the contention-based RACH procedure (e.g., indicated in the first set of RACH parameters) matches (e.g., is equal to) the second root sequence index associated with the dedicated preamble of the contention-free RACH procedure (e.g., indicated in the beam failure recovery information, such as in the second set of RACH parameters). In one aspect, when the RACH component 908 determines the first ZCZC value associated with the contention-based RACH procedure matches (e.g., is equal to) the second ZCZC value associated with the dedicated preamble and the first root sequence index associated with the contention-based RACH procedure matches (e.g., is equal to) the second root sequence index associated with the dedicated preamble of the contention-free RACH procedure, the RACH component 908 may determine that the RACH component 908 is to indicate the beam failure recovery request to the base station 950 using the contention-free RACH procedure with the dedicated preamble. Otherwise, the RACH component 908 may determine that the RACH component 908 is to indicate the beam failure recovery request to the base station 950 using the contention-based RACH procedure.

If the RACH component 908 determines that the beam failure recovery request is to be indicated to the base station 950 using the contention-based RACH procedure, the RACH component 908 may perform the contention-based RACH procedure. In one aspect, the RACH component 908 may perform the contention-based RACH procedure based on the first set of RACH parameters.

As described, supra, to perform the contention-based RACH procedure, the RACH component 908 may first generate and transmit a contention-based RACH preamble (e.g., MSG1). The RACH component 908 may receive a random access response from the base station 950 based on the contention-based RACH preamble. The random access response may include at least a timing advance. The RACH component 908 may generate and transmit to the base station 950 an RRC connection request message (e.g., MSG3) based on the random access response. The RACH component 908 may receive a contention resolution message (e.g., MSG4) based on the RRC connection request message to complete the contention-based RACH procedure.

To perform the contention-free RACH procedure, the RACH component 908 may determine the dedicated preamble—e.g., based on a preamble index and/or based on the second ZCZC value and second root sequence index indicated in the beam failure recovery information. The RACH component 908 may send the dedicated preamble to the base station 950. The beam management component 910 may indicate a candidate beam to the transmission component 906, and the dedicated preamble may be transmitted through the candidate beam. Based on the dedicated preamble, the RACH component 908 may receive a random access response from the base station. The random access response may include a timing advance, a C-RNTI, and/or an uplink grant.

The RACH component 908 may provide the timing advance from the random access response to the synchronization component 912, which may apply the timing advance to reacquire timing synchronization with the base station 950. The transmission component 906 may then resume transmitting uplink signals to the base station 950, e.g., through the candidate beam (potentially now the serving beam) and/or based on an uplink grant included in the random access response.

The apparatus may include additional components that perform each of the blocks of the algorithm in the aforementioned call flows and/or flowcharts of FIGS. 4, 5A and 5B, 6, and 7. As such, each block in the aforementioned flowcharts of FIGS. 4, 5A and 5B, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
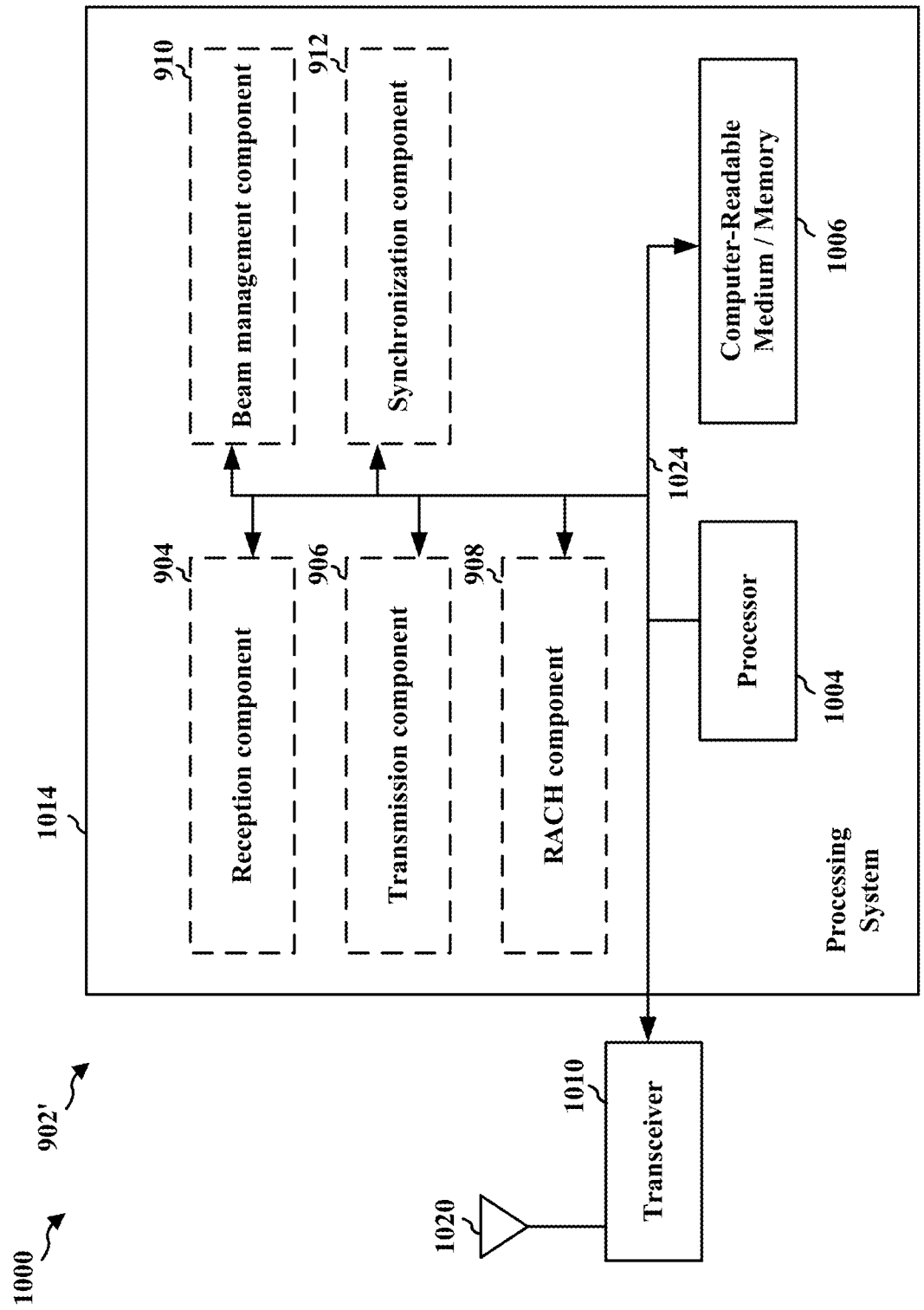
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining whether to indicate a beam failure recovery request to a base station using a contention-free RACH procedure with a dedicated preamble when the UE is timing unsynchronized with the base station. The apparatus 902/902' may include means for performing, when the apparatus 902/902' is timing unsynchronized with the base station, the contention-free RACH procedure with the dedicated preamble to indicate the beam failure recovery request when the beam failure recovery request is determined to be indicated to the base station using the contention-free RACH procedure with the dedicated preamble. The apparatus 902/902' may include means for performing, when the apparatus 902/902' is timing unsynchronized with the base station, a contention-based RACH procedure to indicate the beam failure recovery request when the beam failure recovery request is undetermined to be sent to the base station using the contention-free RACH procedure with the dedicated preamble.

In one aspect, the apparatus 902/902' may include means for detecting a failure of a serving beam through which the UE communicates with the base station. The apparatus 902/902' may include means for determining that the UE is timing unsynchronized with the base station, and the determining whether to indicate a beam failure recovery request to a base station using the contention-free RACH procedure with the dedicated preamble when the UE is timing unsynchronized with the base station is based on the detecting of the failure of the serving beam and the determining that the UE is timing unsynchronized with the base station.

In one aspect, the detecting the failure of the serving beam is based on a BLER associated with one or more TBs received through the serving beam. In one aspect, the apparatus 902/902' is timing unsynchronized with the base station when boundaries of at least one of symbols, slots, subframes, or any combination thereof are unaligned between the apparatus 902/902' and the base station. In one aspect, the apparatus 902/902' is timing unsynchronized with the base station when a timing offset between the apparatus 902/902' and the base station satisfies a threshold, wherein the threshold is configured by the base station. In one aspect, the apparatus 902/902' is timing unsynchronized with the base station when a timing advance command is unreceived before expiration of an alignment timer.

In one aspect, the apparatus 902/902' may include means for performing the contention-free RACH procedure with the dedicated preamble to indicate the beam failure recovery request when the UE is timing synchronized with the base station. In one aspect, the means for determining whether to indicate the beam failure recovery request to the base station using the contention-free RACH procedure with the dedicated preamble when the apparatus 902/902' is timing unsynchronized with the base station is configured to determine whether a first set of resources allocated in association with the dedicated preamble at least partially overlaps with a second set of resources allocated in association with the contention-based RACH procedure, and the beam failure recovery request is determined to be indicated to the base station using the contention-free RACH procedure with the dedicated preamble when the first set of resources is determined to at least partially overlap with the second set of resources. In one aspect, at least one of the first set of resources or the second set of resources is associated with a RACH occasion, wherein the RACH occasion comprises a set of time and frequency resources for a RACH procedure.

In one aspect, the means for determining whether to indicate the beam failure recovery request to the base station using the contention-free RACH procedure with the dedicated preamble when the UE is timing unsynchronized with the base station is configured to determine whether a first zeroCorrelationZoneConfig value associated with the dedicated preamble is equal to a second zeroCorrelationZoneConfig value associated with the contention-based RACH procedure, and the beam failure recovery request is determined to be indicated to the base station using the contention-free RACH procedure with the dedicated preamble when the first zeroCorrelationZoneConfig value is equal to the second zeroCorrelationZoneConfig value. In one aspect, the means for determining whether to indicate the beam failure recovery request to a base station using the contention-free RACH procedure with the dedicated preamble when the UE is timing unsynchronized with the base station is further configured to determine whether a first root sequence index associated with the dedicated preamble is equal to a second root sequence index associated with the contention-based RACH procedure, and the beam failure recovery request is further determined to be indicated to the base station using the contention-free RACH procedure with the dedicated preamble when the first root sequence index is equal to the second root sequence index.

In one aspect, the means for performing procedure with the dedicated preamble is configured to send the dedicated preamble to the base station, and receive a random access response from the base station based on the dedicated preamble, wherein the random access response indicates at least one of a timing advance, a C-RNTI, or an uplink grant. In one aspect, the apparatus 902/902' further includes means for determining a candidate beam for communication with the base station, and the dedicated preamble is sent through the candidate beam.

In one aspect, the contention-based RACH procedure is associated with a first set of resources and the dedicated preamble of the contention-free RACH procedure is associated with a second set of resources, and the first set of resources and the second set of resources are frequency-division multiplexed. In one aspect, the dedicated preamble is code-division multiplexed with one or more other preambles associated with the contention-based RACH procedure. In one aspect, the apparatus 902/902' further includes means for receiving, from the base station, a first set of parameters associated with the contention-based RACH procedure, and means for receiving, from the base station, a second set of parameters associated with the contention-free RACH procedure with the dedicated preamble. In one aspect, the first set of parameters is received in at least one SIB, and the second set of parameters is received via RRC signaling.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
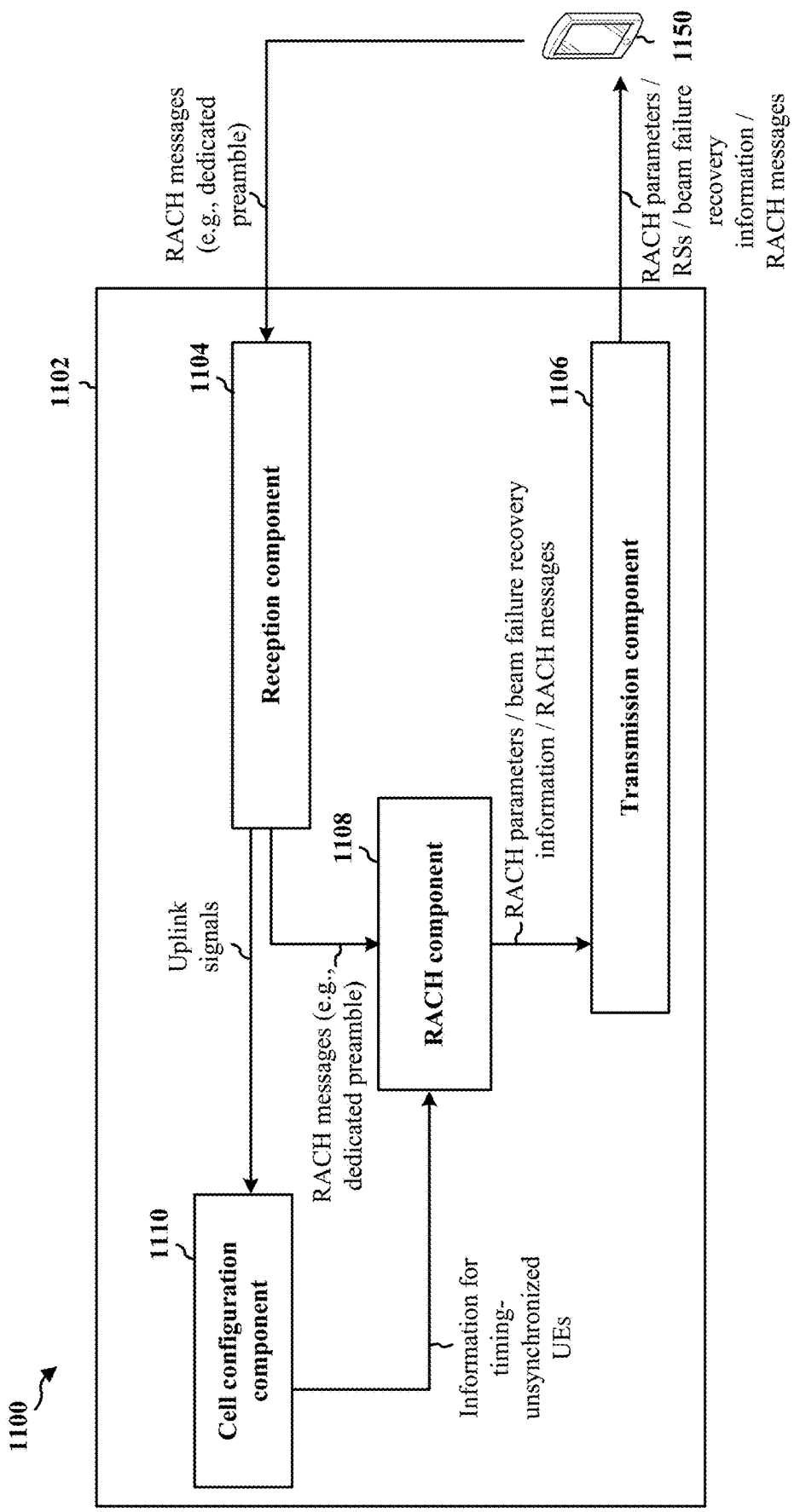
FIG. 11 is a conceptual data flow diagram illustrating the data flow between different means/components in an example apparatus.

FIG. 11 is a conceptual data flow diagram 1100 illustrating the data flow between different means/components in an apparatus 1102, in accordance with one or more aspects of the present disclosure. The apparatus 902 may be a base station. For example, referring to FIGS. 1-6, the apparatus 1102 may be embodied in the base station 102/180, the base station 310, the base station 402, the base station 502, and/or the base station 602. The apparatus 1102 may include a reception component 1104 configured to receive signals (e.g., uplink signals) from a UE 1150. The apparatus 1102 may include a transmission component 1106 configured to transmit signals (e.g., downlink signals) to the UE 1150.

The apparatus 1102 may further include a RACH component 1108. The RACH component 1108 may be configured to configure a first set of parameters associated with a contention-based RACH procedure. The RACH component 1108 may be configured to configure a second set of parameters associated with a contention-free RACH procedure with a dedicated preamble, and the contention-free RACH procedure with the dedicated preamble may be associated with a beam failure recovery request.

The transmission component 1106 may be configured to broadcast the first set of parameters in a cell provided by the apparatus 1102. The RACH component 1108 may perform the contention-based RACH procedure with the UE 1150, e.g., based on the first set of RACH parameters. In addition, the transmission component 1106 may be further configured to send the second set of parameters to the UE 1150.

The apparatus 1102 may further include a cell configuration component 1110. The cell configuration component 1110 may be further configured to determine whether the UE 1150 is permitted to indicate the beam failure recovery request using the contention-free RACH procedure with the dedicated preamble when the UE 1150 is timing unsynchronized with the apparatus 1102. For example, the UE 1150 may be timing unsynchronized with the apparatus 1102 when at least one of symbols, slots, and/or subframes are unaligned between the apparatus 1102 and the UE 1150. In another example, the UE 1150 may be timing unsynchronized with the apparatus 1102 when a timing offset between the apparatus 1102 and the UE 1150 exceeds a threshold, and the threshold may be configured by the cell configuration component 1110.

The cell configuration component 1110 may be further configured to determine whether the UE 1150 is permitted to indicate the beam failure recovery request using the contention-free RACH procedure with the dedicated preamble when the UE 1150 is timing unsynchronized with the apparatus 1102 based on a number of UEs operating on the cell provided by the apparatus 1102. For example, the cell configuration component 1110 may determine whether an available number of cyclic shifts associated with RACH preambles is able to support the number of UEs operating on the cell. The cell configuration component 1110 may compare the number of UEs operating on the cell to a threshold, and the cell configuration component 1110 may determine whether the number of UEs operating on the cell satisfies the threshold. When the number of UEs operating on the cell satisfies the threshold, then the cell configuration component 1110 may determine that the UE 1150 is not permitted to indicate the beam failure recovery request using the contention-free RACH procedure with the dedicated preamble, and should use a contention-based RACH procedure.

The cell configuration component 1110 may indicate, to the RACH component 1108, whether the UE 1150 is permitted to indicate the beam failure recovery request using the contention-free RACH procedure with the dedicated preamble when the UE 1150 is timing unsynchronized with the apparatus 1102. The RACH component 1108 may determine information associated with beam failure recovery (e.g., the second set of RACH parameters) based on whether the UE 1150 is permitted to indicate the beam failure recovery request using the contention-free RACH procedure with the dedicated preamble when the UE 1150 is timing unsynchronized with the apparatus 1102.

In one aspect, the RACH component 1108 may allocate a first set of resources in association with the contention-based RACH procedure, and may allocate a second set of resources in association with the dedicated preamble for the contention-free RACH procedure. The first set of resources may be associated with a first RACH occasion and/or a first RACH region, and the second set of resources may be associated with a second RACH occasion and/or a second RACH region. If the UE 1150 is permitted to indicate the beam failure recovery request using the contention-free RACH procedure with the dedicated preamble when the UE 1150 is timing unsynchronized with the apparatus 1102, then the first set of resources may at least partially overlap with the second set of resources. If the UE 1150 is not permitted to indicate the beam failure recovery request using the contention-free RACH procedure with the dedicated preamble when the UE 1150 is timing unsynchronized with the apparatus 1102, then the first set of resources may not at least partially overlap with the second set of resources.

In one aspect, the RACH component 1108 may configure a first ZCZC value and a first root sequence index for the first set of RACH parameters, and may configure a second ZCZ value and a second root sequence index for the second set of RACH parameters. If the UE 1150 is permitted to indicate the beam failure recovery request using the contention-free RACH procedure with the dedicated preamble when the UE 1150 is timing unsynchronized with the apparatus 1102, then at least the first ZCZC value may match the second ZCZC value. In some aspects, the first root sequence index may match the second root sequence index (in addition to the first ZCZC value matching the second ZCZC value) if the UE 1150 is permitted to indicate the beam failure recovery request using the contention-free RACH procedure with the dedicated preamble when the UE 1150 is timing unsynchronized with the apparatus 1102.

In one aspect, the RACH component 1108 may perform, with the UE 1150, the contention-free RACH procedure with the dedicated preamble based on the second set of RACH parameters if the UE 1150 is permitted to indicate the beam failure recovery request using the contention-free RACH procedure with the dedicated preamble when the UE 1150 is timing unsynchronized with the apparatus 1102. For example, the RACH component 1108 may perform, with the UE 1150, the contention-free RACH procedure with the dedicated preamble by receiving the dedicated preamble from the UE 1150 through a candidate beam different from a serving beam through which the UE 1150 communicates with the apparatus 1102. Further, the RACH component 1108 may send a random access response to the UE 1150 based on the dedicated preamble, and the random access response may indicate at least one of a timing advance, a C-RNTI, and/or an uplink grant. In one aspect, the dedicated preamble is received through the candidate beam based on a failure of the serving beam through which the apparatus 1102 communicates with the UE 1150, and the candidate beam may correspond to at least one RS.

The RACH component 1108 may be further configured to assign one or more dedicated RACH resources to the at least one RS. Further, the RACH component 1108 may configure a threshold associated with the at least one RS, and the threshold may be associated with the beam failure recovery request.

In one aspect, the contention-based RACH procedure is associated with a first set of resources, and the dedicated preamble of the contention-free RACH procedure is associated with a second set of resources, and the first set of resources is frequency-division multiplexed with the second set of resources. In one aspect, the dedicated preamble is code-division multiplexed with one or more other preambles associated with the contention-based RACH procedure.

The apparatus may include additional components that perform each of the blocks of the algorithm in the aforementioned call flows and/or flowcharts of FIGS. 4, 5A and 5B, 6, and 8. As such, each block in the aforementioned flowcharts of FIGS. 4, 5A and 5B, 6, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
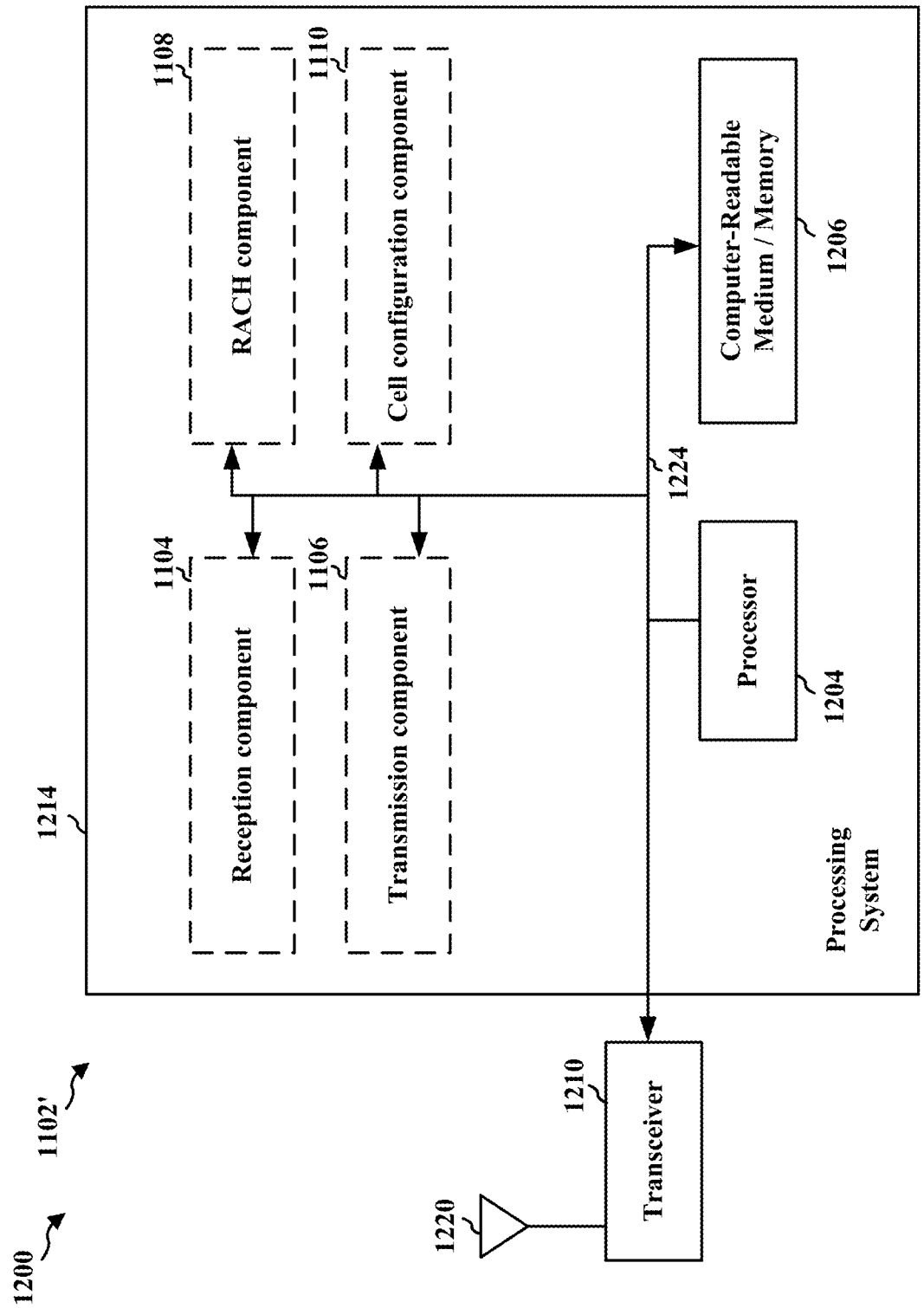
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375.

In one configuration, the apparatus 1102/1102' for wireless communication includes means for configuring a first set of parameters associated with a contention-based RACH procedure. The apparatus 1102/1102' includes means for configuring a second set of parameters associated with a contention-free RACH procedure with a dedicated preamble, and the contention-free RACH procedure with the dedicated preamble is associated with a beam failure recovery request. The apparatus 1102/1102' includes means for broadcasting the first set of parameters in the cell. The apparatus 1102/1102' includes means for sending the second set of parameters to a UE operating on the cell. The apparatus 1102/1102' means for determining whether the UE is permitted to indicate the beam failure recovery request using the contention-free RACH procedure with the dedicated preamble when the UE is timing unsynchronized with the apparatus 1102/1102'. In one aspect, the UE is timing unsynchronized with the apparatus 1102/1102' when boundaries of at least one of symbols, slots, subframes, or any combination thereof are unaligned between the apparatus 1102/1102' and the UE. In one aspect, the UE is timing unsynchronized with the apparatus 1102/1102' when a timing offset between the apparatus 1102/1102' and the UE exceeds a threshold configured by the apparatus 1102/1102'.

In one aspect, a first set of resources allocated in association with the contention-based RACH procedure at least partially overlaps with a second set of resources allocated to the UE in association with the dedicated preamble when the UE is permitted to indicate the beam failure recovery request using the contention-free RACH procedure with the dedicated preamble and the UE is timing unsynchronized with the apparatus 1102/1102'. In one aspect, a first set of resources allocated in association with the contention-based RACH procedure does not overlap with a second set of resources allocated to the UE in association with the dedicated preamble when the UE is unpermitted to indicate the beam failure recovery request using the contention-free RACH procedure with the dedicated preamble and the UE is timing unsynchronized with the apparatus 1102/1102'.

In one aspect, a first zeroCorrelationZoneConfig value associated with the first set of parameters is equal to a second zeroCorrelationZoneConfig value associated with the second set of parameters when the UE is permitted to indicate the beam failure recovery request using the contention-free RACH procedure with the dedicated preamble and the UE is timing unsynchronized with the apparatus 1102/1102'. In one aspect, a first root sequence index associated with the first set of parameters is equal to a second root sequence index associated with the second set of parameters when the UE is permitted to indicate the beam failure recovery request using the contention-free RACH procedure with the dedicated preamble and the UE is timing unsynchronized with the apparatus 1102/1102'.

In one aspect, the apparatus 1102/1102' further includes means for performing, with the UE, the contention-free RACH procedure with the dedicated preamble based on the second set of parameters when the UE is permitted to indicate the beam failure recovery request using the contention-free RACH procedure with the dedicated preamble and the UE is timing unsynchronized with the apparatus 1102/1102'. In one aspect, the means for performing, with the UE, the contention-free RACH procedure with the dedicated preamble based on the second set of parameters is configured to receive the dedicated preamble from the UE through a candidate beam different from a serving beam, and send a random access response to the UE based on the dedicated preamble, and the random access response indicates at least one of a timing advance, a C-RNTI, or an uplink grant.

In one aspect, the dedicated preamble is received through the candidate beam based on a failure of the serving beam through which the apparatus 1102/1102' communicates with the UE, and wherein the candidate beam corresponds to at least one reference signal. In one aspect, the apparatus 1102/1102' further includes means for assigning one or more dedicated RACH resources to the at least one reference signal, and means for configuring a threshold associated with the at least one reference signal, and the threshold is associated with the beam failure recovery request. In one aspect, the contention-based RACH procedure is associated with a first set of resources and the dedicated preamble of the contention-free RACH procedure is associated with a second set of resources, and wherein the first set of resources and the second set of resources are frequency-division multiplexed. In one aspect, the dedicated preamble is code-division multiplexed with one or more other preambles associated with the contention-based RACH procedure. In one aspect, the first set of parameters is broadcast in at least one SIB, and wherein the second set of parameters is signaled in one or more RRC messages.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
determining whether to use a contention-free random access channel (RACH) procedure with a dedicated preamble or a contention-based RACH procedure for beam failure recovery with a base station based on receiving a RACH configuration from the base station for at least one of the contention-free RACH procedure with the dedicated preamble or the contention-based RACH procedure;
performing, based on detection of a failure of a serving beam through which the UE communicates with the base station, the determined one of the contention-free RACH procedure with the dedicated preamble or the contention-based RACH procedure for the beam failure recovery, wherein the dedicated preamble is determined using a beam corresponding to a reference signal, wherein the reference signal is selected based on a power metric associated with the reference signal.

2. The method of claim 1, further comprising:
detecting the failure of the serving beam through which the UE communicates with the base station.

3. The method of claim 2, wherein the detecting the failure of the serving beam is based on a block error rate (BLER) associated with one or more transport blocks (TBs) received through the serving beam.

4. The method of claim 1, wherein the detection of the failure of the serving beam is based on the UE being timing unsynchronized with the base station when boundaries of at least one of symbols, slots, subframes, or any combination thereof are unaligned between the UE and the base station.

5. The method of claim 1, wherein the detection of the failure of the serving beam is based on the UE being timing unsynchronized with the base station when a timing advance command is not received before expiration of an alignment timer.

6. The method of claim 1, wherein the determining whether to use the contention-free RACH procedure with the dedicated preamble or the contention-based RACH procedure for the beam failure recovery with the base station comprises:
determining, based on the RACH configuration, whether a first set of resources allocated in association with the dedicated preamble at least partially overlaps with a second set of resources allocated in association with the contention-based RACH procedure; and
determining whether to use the contention-free RACH procedure with the dedicated preamble or the contention-based RACH procedure for the beam failure recovery with the base station based on whether the first set of resources is determined to at least partially overlap with the second set of resources.

7. The method of claim 6, wherein at least one of the first set of resources or the second set of resources is associated with a RACH occasion, wherein the RACH occasion comprises a set of time and frequency resources for a RACH procedure.

8. The method of claim 1, wherein the determining whether to use the contention-free RACH procedure with the dedicated preamble or the contention-based RACH procedure for the beam failure recovery with the base station comprises:
determining, based on the RACH configuration, whether a first zeroCorrelationZoneConfig value associated with the dedicated preamble is equal to a second zeroCorrelationZoneConfig value associated with the contention-based RACH procedure; and
determining whether to use the contention-free RACH procedure with the dedicated preamble or the contention-based RACH procedure for the beam failure recovery with the base station based on whether the first zeroCorrelationZoneConfig value is equal to the second zeroCorrelationZoneConfig value.

9. The method of claim 8, wherein the determining whether to use the contention-free RACH procedure with the dedicated preamble or the contention-based RACH procedure for the beam failure recovery with the base station further comprises:
determining, based on the RACH configuration, whether a first root sequence index associated with the dedicated preamble is equal to a second root sequence index associated with the contention-based RACH procedure; and
determining whether to use the contention-free RACH procedure with the dedicated preamble or the contention-based RACH procedure for the beam failure recovery with the base station based on whether the first root sequence index is equal to the second root sequence index.

10. The method of claim 1, wherein, when the contention-free RACH procedure with the dedicated preamble is determined to be used for the beam failure recovery with the base station, the performing the determined one of the contention-free RACH procedure with the dedicated preamble or the contention-based RACH procedure comprises:
sending the dedicated preamble to the base station;
receiving a random access response from the base station based on the dedicated preamble, wherein the random access response indicates at least one of a timing advance, a cell radio network temporary identifier (C-RNTI), or an uplink grant; and
acquiring timing synchronization based on at least the timing advance.

11. The method of claim 10, further comprising:
determining a candidate beam for communication with the base station, wherein the dedicated preamble is sent through the candidate beam.

12. The method of claim 1, further comprising:
receiving, from the base station, a first set of parameters associated with the contention-based RACH procedure; and
receiving, from the base station, information associated with the beam failure recovery with the base station, wherein the information associated with the beam failure recovery with the base station comprises a second set of parameters associated with the contention-free RACH procedure with the dedicated preamble.

13. The method of claim 12, wherein the first set of parameters is received in at least one system information block (SIB), and the second set of parameters is received via radio resource control (RRC) signaling.

14. An apparatus for wireless communication by a user equipment (UE), the apparatus comprising:
a memory; and
at least one processor coupled to the memory and configured to:
determine whether a contention-free random access channel (RACH) procedure with a dedicated preamble or a contention-based RACH procedure for beam failure recovery with a base station based on reception of a RACH configuration from the base station for at least one of the contention-free RACH procedure with the dedicated preamble or the contention-based RACH procedure;

perform, based on detection of a failure of a serving beam through which the UE communicates with the base station, the determined one of the contention-free RACH procedure with the dedicated preamble or the contention-based RACH procedure for the beam failure recovery, wherein the dedicated preamble is determined using a beam corresponding to a reference signal, wherein the reference signal is selected based on a power metric associated with the reference signal.

15. The apparatus of claim 14, wherein the at least one processor is further configured to:

detect the failure of the serving beam through which the UE communicates with the base station.

16. The apparatus of claim 15, wherein the detection of the failure of the serving beam is based on a block error rate (BLER) associated with one or more transport blocks (TBs) received through the serving beam.

17. The apparatus of claim 14, wherein the determination of whether to use the contention-free RACH procedure with the dedicated preamble or the contention-based RACH procedure for the beam failure recovery with the base station comprises to:

determine, based on the RACH configuration, whether a first set of resources allocated in association with the dedicated preamble at least partially overlaps with a second set of resources allocated in association with the contention-based RACH procedure; and determine whether to use the contention-free RACH procedure with the dedicated preamble or the contention-based RACH procedure for the beam failure recovery with the base station based on whether the first set of resources is determined to at least partially overlap with the second set of resources.

18. The apparatus of claim 14, wherein the determination of whether to use the contention-free RACH procedure with the dedicated preamble or the contention-based RACH procedure for the beam failure recovery with the base station comprises to:

determine, based on the RACH configuration, whether a first zeroCorrelationZoneConfig value associated with the dedicated preamble is equal to a second zeroCorrelationZoneConfig value associated with the contention-based RACH procedure; and determine whether to use the contention-free RACH procedure with the dedicated preamble or the contention-based RACH procedure for the beam failure recovery with the base station based on whether the first zeroCorrelationZoneConfig value is equal to the second zeroCorrelationZoneConfig value.

19. The apparatus of claim 14, wherein, when the contention-free RACH procedure with the dedicated preamble is determined to be used for the beam failure recovery with the base station, the performance of the determined one of the contention-free RACH procedure with the dedicated preamble or the contention-based RACH procedure comprises to:

send the dedicated preamble to the base station;

receive a random access response from the base station based on the dedicated preamble, wherein the random access response indicates at least one of a timing advance, a cell radio network temporary identifier (C-RNTI), or an uplink grant; and acquire timing synchronization based on at least the timing advance.

20. A method of wireless communication by a base station providing a cell, the method comprising:

configuring a first set of parameters for beam failure recovery by a user equipment (UE), the first set of parameters being associated with one of a contention-free random access channel (RACH) procedure with a dedicated preamble or a contention-based RACH procedure; and transmitting at least the first set of parameters to enable the UE to determine whether to use the contention-free RACH procedure or the contention-based RACH procedure for the beam failure recovery; and receiving a dedicated preamble corresponding to a beam corresponding to a reference signal when the UE initiates a contention-free RACH procedure for the beam failure recovery, wherein the dedicated preamble is determined using the beam ID-corresponding to the reference signal, wherein the reference signal is selected based on a power metric associated with the reference signal.

21. The method of claim 20, wherein a first set of resources allocated in association with the contention-based RACH procedure at least partially overlaps with a second set of resources allocated to the UE in association with the dedicated preamble to indicate the UE is to determine to use the contention-free RACH procedure with the dedicated preamble instead of the contention-based RACH procedure for the beam failure recovery.

22. The method of claim 20, wherein a first set of resources allocated in association with the contention-based RACH procedure does not overlap with a second set of resources allocated to the UE in association with the dedicated preamble to indicate the UE is to determine to use the contention-based RACH procedure instead of the contention-free RACH procedure with the dedicated preamble for the beam failure recovery.

23. The method of claim 20, wherein a first zeroCorrelationZoneConfig value associated with the contention-based RACH procedure is equal to a second zeroCorrelationZoneConfig value associated with the contention-free RACH procedure to indicate the UE is to determine to use the contention-free RACH procedure with the dedicated preamble instead of the contention-based RACH procedure for the beam failure recovery.

24. The method of claim 23, wherein a first root sequence index associated with the contention-based RACH procedure is equal to a second root sequence index associated with the contention-free RACH procedure to indicate the UE is to determine to use the contention-free RACH procedure with the dedicated preamble instead of the contention-based RACH procedure for the beam failure recovery.

25. The method of claim 20, further comprising:

performing, with the UE for the beam failure recovery, one of the contention-based RACH procedure or the contention-free RACH procedure with the dedicated preamble based on the first set of parameters.

26. The method of claim 25, wherein when the contention-free RACH procedure is performed with the UE for the beam failure recovery, the performing, with the UE for the beam failure recovery, the one of the contention-based RACH procedure or the contention-free RACH procedure with the dedicated preamble comprises:

receiving the dedicated preamble from the UE through a candidate beam different from a serving beam; and sending a random access response to the UE based on the dedicated preamble, wherein the random access response indicates at least one of a timing advance, a cell radio network temporary identifier (C-RNTI), or an uplink grant.

27. The method of claim 20, wherein at least one of:
the contention-based RACH procedure is associated with a first set of resources and the dedicated preamble of the contention-free RACH procedure is associated with a second set of resources, and wherein the first set of resources and the second set of resources are frequency-division multiplexed, or
the dedicated preamble is code-division multiplexed with one or more other preambles associated with the contention-based RACH procedure.

28. An apparatus for wireless communication by a base station providing a cell, the apparatus comprising:
a memory; and
at least one processor coupled to the memory and configured to:
configure a first set of parameters for beam failure recovery by a user equipment (UE), the first set of parameters being associated with one of a contention-free random access channel (RACH) procedure with a dedicated preamble or a contention-based RACH procedure; and
transmit at least the first set of parameters to enable the UE to determine whether to use the contention-free RACH procedure or the contention-based RACH procedure for the beam failure recovery; and
receiving a dedicated preamble corresponding to a beam corresponding to a reference signal when the UE initiates a contention-free RACH procedure for the beam failure recovery, wherein the dedicated preamble is determined using the beam ID-corresponding to the reference signal, wherein the reference signal is selected based on a power metric associated with the reference signal.

29. The apparatus of claim 28, wherein the at least one processor is further configured to:
perform, with the UE for the beam failure recovery, one of the contention-based RACH procedure or the contention-free RACH procedure with the dedicated preamble based on the first set of parameters.

30. The apparatus of claim 29, wherein, when the contention-free RACH procedure is performed with the UE for the beam failure recovery, the performance, with the UE for the beam failure recovery, the one of the contention-based RACH procedure or the contention-free RACH procedure with the dedicated preamble comprises to:
receive the dedicated preamble from the UE through a candidate beam different from a serving beam; and
send a random access response to the UE based on the dedicated preamble, wherein the random access response indicates at least one of a timing advance, a cell radio network temporary identifier (C-RNTI), or an uplink grant.

* * * * *